(12) United States Patent
Nakamura et al.

(10) Patent No.: US 7,666,071 B2
(45) Date of Patent: Feb. 23, 2010

(54) APPARATUS FOR MANUFACTURING CHAINS OF LINKED FOOD PRODUCTS SUCH AS SAUSAGES WITH TWISTED PORTIONS AND HAVING A PLURALITY OF STUFFING TUBES AND METHOD OF MANUFACTURING THE SAME

(75) Inventors: Tatsuo Nakamura, Yokohama (JP); Shinjiro Nakamura, Yokohama (JP)

(73) Assignee: HITEC Co., Ltd., Kanagawa (JP)

( * ) Notice: Subject to any disclaimer, the term of this patent is extended or adjusted under 35 U.S.C. 154(b) by 0 days.

(21) Appl. No.: 12/127,852

(22) Filed: May 28, 2008

(65) Prior Publication Data
US 2008/0311835 A1    Dec. 18, 2008

(30) Foreign Application Priority Data
Jun. 4, 2007    (JP) .............................. 2007-148657

(51) Int. Cl.
    *A22C 11/00*    (2006.01)
(52) U.S. Cl. ........................................ 452/36
(58) Field of Classification Search ............. 452/21–26, 452/30–32, 35–37, 46, 51
    See application file for complete search history.

(56) References Cited

U.S. PATENT DOCUMENTS

| | | | |
|---|---|---|---|
| 3,191,222 A | 6/1965 | Townsend | |
| 3,805,329 A | 4/1974 | Kollross | |
| 3,964,236 A | 6/1976 | Smith | |
| 4,091,505 A | 5/1978 | Muller et al. | |
| 4,434,527 A | 3/1984 | Staudenrausch et al. | |
| RE32,315 E | * 12/1986 | Kollross | ....................... 452/22 |
| 4,847,953 A | * 7/1989 | Evans et al. | .................... 452/36 |
| 4,991,260 A | * 2/1991 | Nausedas | ...................... 452/35 |
| 5,297,983 A | 3/1994 | Mueller et al. | |
| 6,572,465 B2 | 6/2003 | Kimura | |
| 6,964,605 B2 | 11/2005 | Kasai et al. | |

FOREIGN PATENT DOCUMENTS

| | | |
|---|---|---|
| EP | 1623628 | 2/2006 |
| EP | 1647193 | 4/2006 |
| WO | 00/47053 | 8/2000 |
| WO | 02/28191 | 4/2002 |

* cited by examiner

*Primary Examiner*—Thomas Price
(74) *Attorney, Agent, or Firm*—Bachman & LaPointe, P.C.

(57) ABSTRACT

An apparatus for manufacturing chains of linked food products such as sausages with twisted portions and having a plurality of stuffing tubes, includes a plurality of stuffing tubes 2 provided at equal intervals about a rotational axis Xo; a stuffing tube moving body 4 which rotates through predetermined angles about the rotational axis Xo so that the respective stuffing tubes 2 sequentially move to a filling position III; and a stuffed casing conveying means 50 which conveys in a suspended state a stuffed casing C formed by the stuffing tube 2 positioned at the filling position III.

16 Claims, 18 Drawing Sheets

FIG. 17
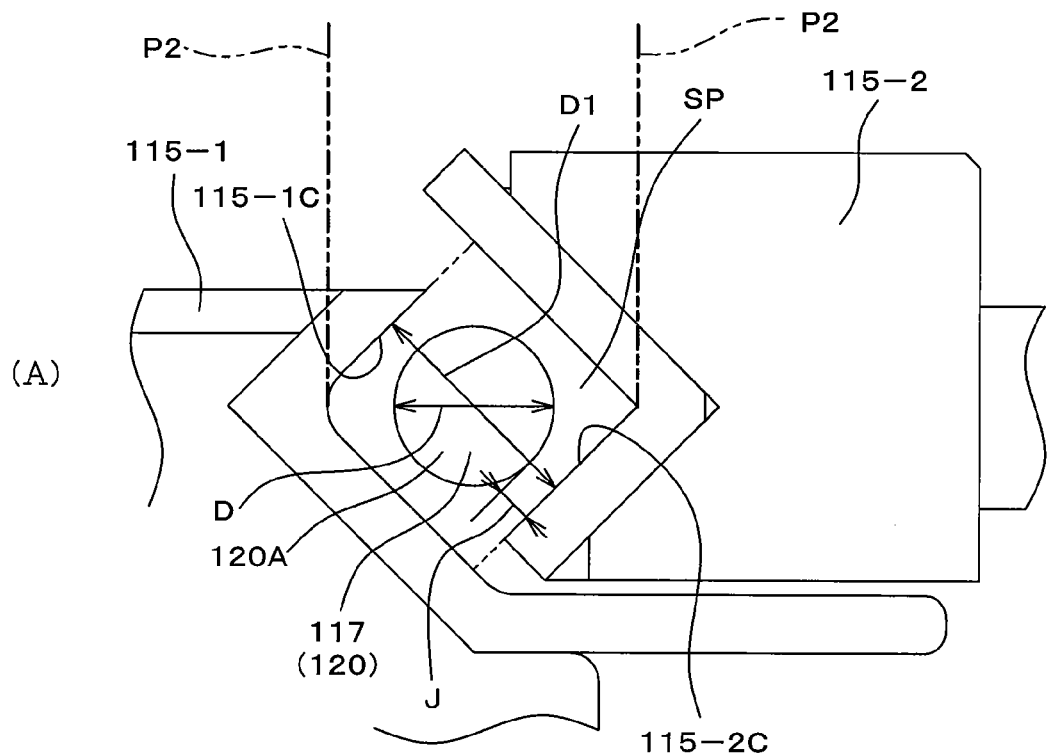
(A)
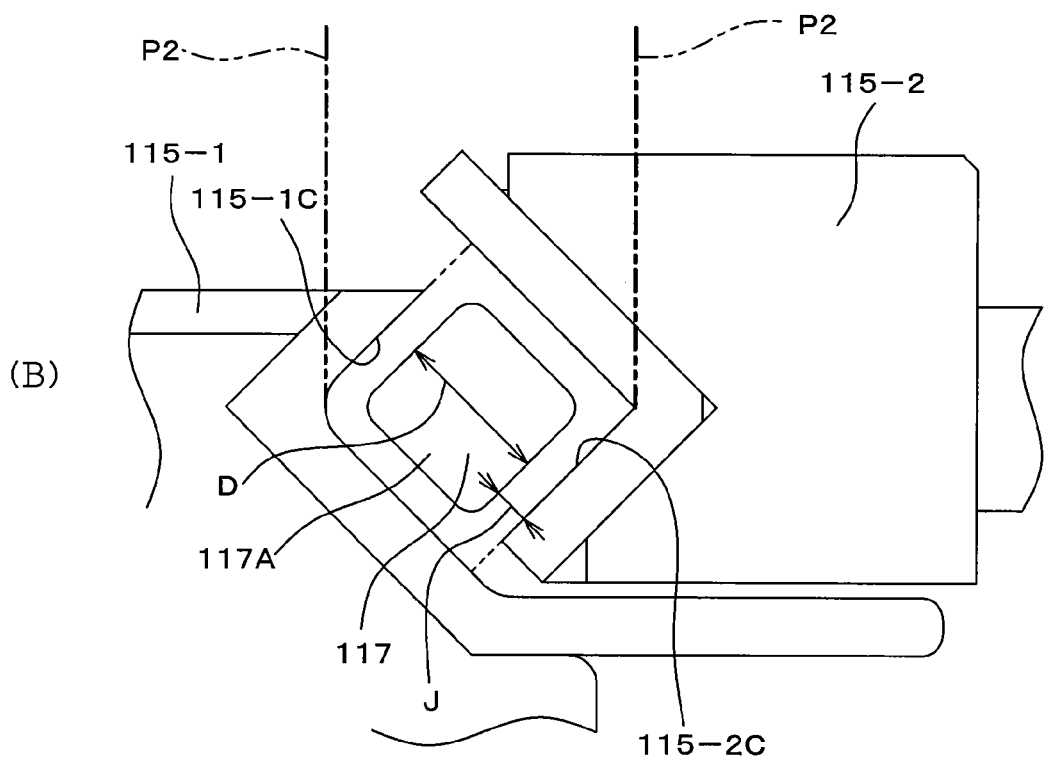
(B)

APPARATUS FOR MANUFACTURING CHAINS OF LINKED FOOD PRODUCTS SUCH AS SAUSAGES WITH TWISTED PORTIONS AND HAVING A PLURALITY OF STUFFING TUBES AND METHOD OF MANUFACTURING THE SAME

TECHNICAL FIELD OF THE INVENTION

The present invention relates to an apparatus for manufacturing chains of linked food products such as sausages with twisted portions and having a plurality of stuffing tubes for discharging a material of a food product such as sausage into a casing, as well as a method of manufacturing the same.

BACKGROUND OF THE INVENTION

Conventionally, apparatuses for manufacturing chains of linked food products such as sausages, which are commonly employed widely, are so constructed as to manufacture food products such as chains of linked food products by discharging a material of a food product such as sausage into a casing by using a rotating stuffing tube. However, manufacturing apparatuses which have a plurality of stuffing tubes for the purpose of improving the productivity of the apparatus and use the plurality of stuffing tubes by changing them over are known in patent documents which will be described later.

In the process of manufacturing sausages, a leading end and a trailing end of a chain of linked sausages with twisted portions are tied manually so as not to cause the filled material to leak therefrom. Normally, twisted portions of natural intestine sausages, as compared with artificial casing sausages, are likely to be untwisted, and the stuffed casing is likely to be broken, so that operations of repairing or removing these defective portions are performed in addition to the above-mentioned manual operation. The extent of the occurrence of these defects differs among individual natural intestine casings, and a large difference can occur in the operating time for the above-described required processing with respect to the stuffed casings. If the operating time becomes long, a delay occurs in starting the stuffing of an ensuing casing, so that idle time occurs in the machine.

A manufacturing apparatus disclosed in JP-B-59-50294 (see particularly FIG. 3 in that document) is comprised of a sausage making apparatus 1 having two tubes 22 (stuffing tubes) and a pickup 461 for forming the sausage into loop form and suspending it from a guide shaft 471. In this manufacturing apparatus 1, the two tubes are mounted on a turret 113, and the arrangement provided is such that after the tubes are moved by the rotation of the turret, the tubes are alternately communicated with a metering pump 3, to thereby use the tubes after being changed over. In this manufacturing apparatus, a gear 112 provided on the tube is meshed with a gear 114 on the main body side of the apparatus by the rotation of the turret.

However, although the manufacturing apparatus in accordance with JP-B-59-50294 forms the sausage into loop form, since a rotatively driving device for rotating the turret 113 having two stuffing tubes is not provided, this manufacturing apparatus has a problem in the enhancement of the operation rate of the apparatus in using natural intestine casings in which the variation of the quality of the casings is large among individual intestines. Namely, the time required for the manual processing operation by an operator, which is performed with respect to the natural intestine sausage formed into loops, depends on the good or bad quality of the natural intestine casings. Although in the case where only one stuffing tube is provided, it is necessary to allow the casing to be loaded onto the stuffing tube after the stuffing of one casing, in the case of this manufacturing apparatus an ensuing casing can be loaded in advance onto the other stuffing tube during stuffing by one stuffing tube, thereby making it possible to prevent the occurrence of idle time which is otherwise caused. However, since the device for rotatively driving the turret is not provided, in low-quality natural intestine casings requiring a long time in the manual processing operation, a time lag occurs in the timing of rotatively driving the turret by the operator, and idle time increases by that portion. Thus, the manufacturing apparatus disclosed in the patent document 1 is unable to prevent the occurrence of the idle time which can occur due to the variation of the processing time.

Further, in the manufacturing apparatus in accordance with JP-B-59-50294, since the driven gear is meshed with the drive gear by rotating the turret, it is preferable to rotate the turret at a relatively low speed in order to complete the meshing of these gears without trouble.

In a manufacturing apparatus disclosed in U.S. Pat. No. 3,964,236, two stuffing tubes 62 and 64 are mounted on a stuffing tube support 48 which is rotatably supported on a shaft 46, and the arrangement provided is such that after the stuffing tubes are moved by the rotation of the support, the stuffing tubes are alternately communicated with a spindle 26, to thereby use the stuffing tubes after being changed over. In this manufacturing apparatus, by moving the entire support in the axial direction of the shaft while rotating the support, a collar 68 to which the stuffing tube is attached is brought into pressure contact with O-rings 36.

In the manufacturing apparatus in accordance with U.S. Pat. No. 3,964,236, since it is necessary to move the entire support in the axial direction of the stuffing tube while rotating the support in order to couple the stuffing tube to the spindle, it is preferable to rotate the support 48 at a relatively low speed in the light of the inertia of the support which can be generated.

As described above, in the manufacturing apparatuses disclosed in JP-B-59-50294 and U.S. Pat. No. 3,964,236, the arrangement provided is such that the stuffing tube side is coupled to the driving source side while rotating the turret or the support for moving the two stuffing tubes. Therefore, in either apparatus, substantial time is required in the movement and coupling of the stuffing tubes, so that there is a problem in the productivity of the apparatus.

Furthermore, in the manufacturing apparatus in accordance with U.S. Pat. No. 3,964,236, the arrangement provided is such that, during the movement of the stuffing tubes, an end face of the color with the stuffing tube attached thereto has a gap with a sealing surface of a plate 40. Therefore, there is a possibility that the leakage of the material of such as sausage from that gap can occur, resulting in a hygienic problem.

In addition, a manufacturing apparatus disclosed in JP-A-2001-352897 is known which is aimed at improving the productivity of the apparatus. The manufacturing apparatus in accordance with JP-A-2001-352897 is adapted to continuously perform the production of natural intestine sausages as well as the transporting of a chain of natural intestine sausages in the form of loops and the processing of its ends. However, in a case where, at the time when the end of the chain of sausages is passed through a heating tank, the loop of sausages is manually removed from suspending members to immerse the end of the chain of sausages in the heating tank, the apparatus has a problem in that the period of time for performing that operation is limited.

JP-A-47-43379 discloses a sausage manufacturing apparatus which has four nozzles and in which these nozzles are capable of sequentially moving to a position in front of an outlet of a filling machine along a circular path. In this manufacturing apparatus, during filling by a nozzle 36 communicating with the outlet of the filling machine, a sausage casing with one end already closed is loaded on another nozzle 36 located at a lowermost position. In this apparatus, a sausage consisting of only one link is manufactured with one sausage casing by closing the other end as well. Further, this apparatus has a structure in which each nozzle does not rotate about its own axis, and twisted portions are not formed in the casing. Accordingly, in this manufacturing apparatus, the operator needs not to process the end of the filled casing during filling, and needs not to perform the processing operation which would normally be required in the manufacture of a chain of linked sausages with twisted portions. In other words, the manufacturing apparatus in accordance with JP-A-47-43379 does not address the technological problems of the invention.

In a manufacturing apparatus disclosed in JP-B-41-5899, a clamp consisting of a pair of V-shaped members opposing both sides of a casing is provided in such a manner as to be capable of coming into contact with and moving away from the both sides of the casing in a horizontal direction. Further, a hopper with a plurality of casings accommodated therein is disposed above one of the members, and the aforementioned both V-shaped members approach and clamp the casing and dispose the casing at a predetermined position. A stuffing tube moves toward the casing disposed at the predetermined position and is inserted into a bore of the tubular casing.

The casing loading apparatus disclosed in the manufacturing apparatus in accordance with JP-B-41-5899 is effective with respect to the sausage manufacturing apparatus of the type in which the stuffing tube moves in its longitudinal direction. However, the casing loading apparatus cannot be applied to the apparatus of the type in which the stuffing tube does not move in its longitudinal direction, as in the apparatus in accordance with JP-B-63-62170, which will be described below.

A casing loading apparatus disclosed in a manufacturing apparatus in accordance with JP-B-63-62170 has a guiding chute for setting the casings horizontally and arranging a plurality of such casings in a vertical direction. A receiving plate is located below an opening of the guiding chute at a spacing corresponding to one casing, and a finger 18 mounted to a pushing member for allowing a lowermost casing positioned on the receiving plate to be pushed out in its longitudinal direction and for moving that casing to the stuffing tube on standby in the outside. The lowermost casing is fed out in its longitudinal direction in a state in which it is sandwiched by another casing placed thereon and the receiving plate.

In the casing loading apparatus in accordance with JP-B-63-62170, the lowermost casing moves in its longitudinal direction while being brought into rubbing contact with the casing placed thereon, so that there is a possibility that the folds of the upper and lower casings bite onto each other, causing deformation of the folds. Furthermore, during the returning movement of the pushing member 27, the finger 18 moves in a state of being in contact with an outer periphery of the sausage skin 10 located at the lowermost position, there is a possibility of the outer periphery of the casing becoming damaged by the finger 18.

Furthermore, a casing loading apparatus disclosed in JP-A-5-192068 is known. In the apparatus in accordance with JP-A-5-192068, a gut caterpillar is fed to a centering means having a conveyor means, and the gut caterpillar is arranged in front of a stuffing tube so as to be in substantial alignment with the stuffing tube, and is placed on the stuffing tube from this position. A centering element provided above and immediately in front of the stuffing tube is adapted to effect the centering of the gut caterpillar placed on a conveyor belt with respect to the stuffing tube. However, in the apparatus in accordance with JP-A-2001-352897, if a difference is caused in the driving force acting on the gut caterpillar due to the conveyor and the centering element, there is a possibility of loosening the gathers of the gut caterpillar.

SUMMARY OF THE INVENTION

The present invention has been devised in view of the above-described aspects, an its first object is to provide a method and an apparatus for manufacturing chains of linked food products such as sausages with twisted portions and having a plurality of stuffing tubes, which are capable of reducing the idle time of the manufacturing apparatus even if casings are used which produce a large difference in the operating time for the required processing of stuffed casings.

A second object of the invention is to provide an apparatus for manufacturing chains of linked food products such as sausages with twisted portions and having a plurality of stuffing tubes, which is capable of making the movement of the stuffing tubes fast and of achieving in a short time the coupling of the stuffing tube and a stuffing tube driving mechanism and is highly productive.

A third object of the invention is to provide an apparatus for manufacturing chains of linked food products such as sausages with twisted portions and having a plurality of stuffing tubes, which facilitates the closing processing operation of a leading end of the stuffed casing and is highly productive.

A fourth object of the invention is to provide a method and an apparatus for manufacturing chains of linked food products such as sausages with twisted portions and having a plurality of stuffing tubes, in which a high-rigidity shirred casing which is curved in its longitudinal direction or a low-rigidity shirred casing which is likely to bend locally can be loaded onto a stuffing tube without error.

A fifth object of the invention is to provide a method and an apparatus for loading a casing onto a stuffing tube, which are applicable to the apparatus for manufacturing chains of linked food products such as sausages with twisted portions and having one or more stuffing tubes, and in which a high-rigidity shirred casing which is curved in its longitudinal direction or a low-rigidity shirred casing which is likely to bend locally can be loaded onto a stuffing tube without error.

According to the invention, the above-described first object can be attained by an apparatus for manufacturing chains of linked food products such as sausages with twisted portions and having a plurality of stuffing tubes, comprising: a hollow member on a longitudinal axis for receiving the supply of a material of a food product from material supplying means; a stuffing tube moving body provided rotatably about a rotational axis located at a predetermined distance from the longitudinal axis; a plurality of hollow spindle members provided through the stuffing tube moving body in such a manner as to be disposed at equal intervals about the rotational axis; a plurality of stuffing tubes fixed to the plurality of hollow spindle members, respectively; a braking member which comes into contact with a casing loaded on the stuffing tube in a state in which the braking member is fitted on the stuffing tube; material-supply-stop commanding means for transmitting a material supply stop signal for stopping the supplying of the food product material to the hollow member; braking-member disengaging driving means for disengaging the braking member from the stuffing tube; stuffing-tube-movingbody driving means for moving the plurality of hollow spindle members to a position of communication with the hollow member by rotating the stuffing tube moving body through a predetermined angle about the rotational axis; suspending members which are disposed downstream of the stuffing tube fixed to the hollow spindle member communicating with the hollow member, and move in a state in which the stuffed casing filled with the food product material is suspended therefrom; and controlling means for controlling the operation of the braking-member disengaging driving means and the stuffing-tube-moving-body driving means after the signal transmission by the material-supply-stop commanding means.

According to the invention, the above-described first object can be attained by a method of manufacturing chains of linked food products such as sausages with twisted portions by using the above-described apparatus for manufacturing chains of linked food products such as sausages with twisted portions and having a plurality of stuffing tubes, comprising the steps of: performing through an operator's manual operation processing required for a stuffed casing suspended from the suspending members while a stuffed casing is being formed by the stuffing tube; performing through a same operator's manual operation the loading of the casing onto another one of the stuffing tubes while the stuffed casing is being formed by the stuffing tube; and performing through the same operator's manual operation required processing for the stuffed casing suspended from the suspending members during the rotation of the stuffing tube moving body which is effected after the completion of the formation of the stuffed casing by the stuffing tube.

According to the above-described first manufacturing apparatus and manufacturing method for attaining the first object, even if the time for processing operation of the stuffed casings by the operator is prolonged particularly in the case where natural intestine casings are used as casings, stuffing by using the casing loaded on the stuffing tube in advance is automatically started during the above-described processing operation. Therefore, it is possible to prevent the occurrence of the idle time of the apparatus. As a result, the manufacturing apparatus and the manufacturing method are made high in the operation rate. It is also possible to prevent the occurrence of the idle time of the apparatus in the manufacture of sausages using artificial casings.

According to the invention, the above-described second object can be attained by an apparatus for manufacturing chains of linked food products such as sausages with twisted portions and having a stuffing tube, comprising: a hollow member on a longitudinal axis for receiving the supply of a material of a food product from material supplying means; a stuffing tube moving body provided rotatably about a rotational axis located at a predetermined distance from the longitudinal axis; at least one hollow spindle member provided through the stuffing tube moving body in such a manner as to be disposed at a position of a predetermined radial distance from the rotational axis; a stuffing tube fixed to the hollow spindle member; hollow-member rotatively driving means for rotating the hollow member about the longitudinal axis; and coupling means provided on the longitudinal axis and operative to couple the hollow member and the hollow spindle member which has completed the rotational movement through the predetermined angle.

According to the above-described second manufacturing apparatus for attaining the second object, the coupling means is provided independently of the stuffing tube moving body, and after the stuffing tube moving body has completed the movement by a predetermined amount, the coupling means is operated. Since the stuffing tube moving body is not involved in the coupling between the first hollow spindle member and the hollow spindle member, the stuffing tube moving body can be moved at high speed. The coupling in this apparatus is not limited to the means for mechanically coupling the first hollow spindle member and the hollow spindle member. For example, it is possible to use a means for coupling the first hollow spindle member and the hollow spindle member through a magnetic force.

According to the invention, the above-described third object can be attained by an apparatus for manufacturing chains of linked food products such as sausages with twisted portions and having a plurality of stuffing tubes, comprising: a stuffing tube at a loading position for loading a casing onto the stuffing tube; a stuffing tube at a leading end closing position for closing a leading end of the casing located on the stuffing tube; a stuffing tube at a filling position for filling a material into the casing with its leading end closed; and a stuffing tube moving body which rotates so that the stuffing tube with the casing loaded thereon moves to the leading end closing position, the stuffing tube with the leading-end-closed casing loaded thereon moves to the filling position, and the stuffing tube at the filling position moves to the loading position, respectively, the stuffing tube at the loading position, the stuffing tube at the leading end closing position, and the stuffing tube at the filling position being provided at least one each.

According to the above-described third manufacturing apparatus for attaining the third object, since the leading end closing processing can be carried out with respect to the casing loaded on the stuffing tube at the leading end closing position, that processing time is not limited. Therefore, particularly in the use of natural intestine casings it is possible to preferentially perform various processing including the end processing which is performed with respect to the stuffed casing. Hence, the operating efficiency of the overall processing operation improves. The stuffing tube moving means is sufficient if it moves at least three stuffing tubes, and therefore the stuffing tube moving means is capable of moving four or more stuffing tubes. The operating efficiency of the overall processing operation also improves in the manufacture of sausages using artificial casings.

According to the invention, the above-described fourth object can be attained by an apparatus for manufacturing chains of linked food products such as sausages with twisted portions and having a plurality of stuffing tubes, comprising: a hollow member on a longitudinal axis for receiving the supply of a material of a food product from material supplying means; a stuffing tube moving body provided rotatably about a rotational axis located at a predetermined distance from the longitudinal axis; at least one hollow spindle member provided through the stuffing tube moving body in such a manner as to be disposed at a position of a predetermined radial distance from the rotational axis; a stuffing tube fixed to the hollow spindle member; casing holding means holding an outer periphery of a casing downstream of the stuffing tube so that the casing to be loaded onto the stuffing tube is substantially aligned with the stuffing tube which has rotatively moved about the rotational axis through a predetermined angle from the hollow member on the longitudinal axis; and a casing pushing/advancing member for pushing and advancing toward the stuffing tube the casing whose outer periphery is held by the casing holding means, wherein the casing holding means has a pair of holding portions which are disposed in face-to-face relationship to each other and hold the outer periphery of the casing by clamping the same with a predetermined interval therebetween which is formed by the stopping of the advancing toward each other of the mutually opposing holding portions, and wherein the casing pushing/advancing member has a casing pushing/advancing surface which abuts against a front end portion of the casing with its outer periphery held by the pair of holding portions and moves in a space between the pair of holding portions toward the stuffing tube such that the outer periphery of the casing moves in the space between the pair of holding portions extending in a longitudinal direction of the casing toward the stuffing tube while sliding on the pair of holding portions.

According to the above-described manufacturing apparatus for attaining the fourth object, a high-rigidity stick-like shirred casing which is longitudinally curved is corrected straightly, and a low-rigidity stick-like shirred casing which is likely to bend locally is prevented from becoming bent, so that it is possible to enhance the accuracy of alignment between the casing and the stuffing tube, thereby making it possible to load the casing onto the stuffing tube without error.

According to the invention, the above-described fifth object can be attained by a method for loading a casing for a food product such as sausage onto a stuffing tube, comprising the steps of: disposing casing holding means holding an outer periphery of a casing downstream of a stuffing tube so that the casing is substantially aligned with the stuffing tube, and loading onto the stuffing tube the casing held by the casing holding means, comprising the steps of: advancing each of a pair of holding portions of the casing holding means disposed in face-to-face relationship to each other toward an opposing one of the pair of holding portions; stopping the advancing, and holding the outer periphery of the casing by clamping the same by the pair of holding portions opposing each other with a predetermined interval therebetween, to thereby effect positioning so that the casing is substantially aligned with the stuffing tube; pushing and advancing toward the stuffing tube a front end portion of the held casing by a casing pushing/advancing member which moves in a space between the pair of holding portions extending in a longitudinal direction of the casing; and moving toward the stuffing tube the casing being pushed and advanced by the casing pushing/advancing member, while the outer periphery of the casing is slid on the pair of holding portions.

According to the invention, the above-described fifth object can be attained by an apparatus for loading a casing for a food product such as sausage onto a stuffing tube, in which casing holding means holding an outer periphery of a casing is disposed downstream of a stuffing tube so that the casing is substantially aligned with the stuffing tube, and the casing held by the casing holding means is loaded onto the stuffing tube, comprising: a pair of holding portions which are provided in the casing holding means, are disposed in face-to-face relationship to each other, and hold an outer periphery of a casing by clamping the same with a predetermined interval therebetween which is formed by the stopping of the advancing toward each other of the mutually opposing holding portions; and a casing pushing/advancing member which abuts in a space between the pair of holding portions extending in a longitudinal direction of the casing against a front end portion of the casing with its outer periphery held by the pair of holding portions, and moves in the space between the pair of holding portions toward the stuffing tube such that the outer periphery of the casing moves toward the stuffing tube while sliding on the pair of holding portions.

According to the above-described method and apparatus for loading a casing for a food product such as sausage onto a stuffing tube for attaining the fifth object, a high-rigidity stick-like shirred casing which is longitudinally curved is corrected straightly, and a low-rigidity stick-like shirred casing which is likely to bend locally is prevented from becoming bent, so that it is possible to enhance the accuracy of alignment between the casing and the stuffing tube, thereby making it possible to load the casing onto the stuffing tube without error.

According to the invention, it is possible to provide an apparatus for manufacturing chains of linked food products such as sausages with twisted portions and having a plurality of stuffing tubes, which is capable of reducing the idle time of the manufacturing apparatus even if casings are used which produce a large difference in the operating time for the required processing of stuffed casings owing to the variation of the casing quality.

According to the invention, it is possible to provide an apparatus for manufacturing chains of linked food products such as sausages and having a plurality of stuffing tubes, which is capable of making the movement of the stuffing tubes fast and of achieving in a short time the coupling of the stuffing tube and the stuffing tube driving mechanism and is highly productive.

According to the invention, it is possible to provide an apparatus for manufacturing chains of linked food products such as sausages with twisted portions and having a plurality of stuffing tubes, which facilitates the closing processing operation of the leading end of the stuffed casing and is highly productive.

According to the invention, it is possible to provide a method and an apparatus which allow a casing for a food product such as sausage, including a high-rigidity stick-like shirred casing which is longitudinally curved and a low-rigidity stick-like shirred casing which is likely to bend locally, to be loaded onto a stuffing tube without error.

BRIEF DESCRIPTION OF THE DRAWINGS

FIG. 17 is an explanatory right side view of the operation of the casing loading means shown in FIG. 14, in which the part (A) is an explanatory view illustrating in enlarged form an essential structure of a casing holding means in a closed state, and the part (B) is an explanatory diagram illustrating in enlarged form a structure of adaptation to the casing pushing/advancing member of another form.

DETAILED DESCRIPTION OF THE INVENTION

Figure 1:
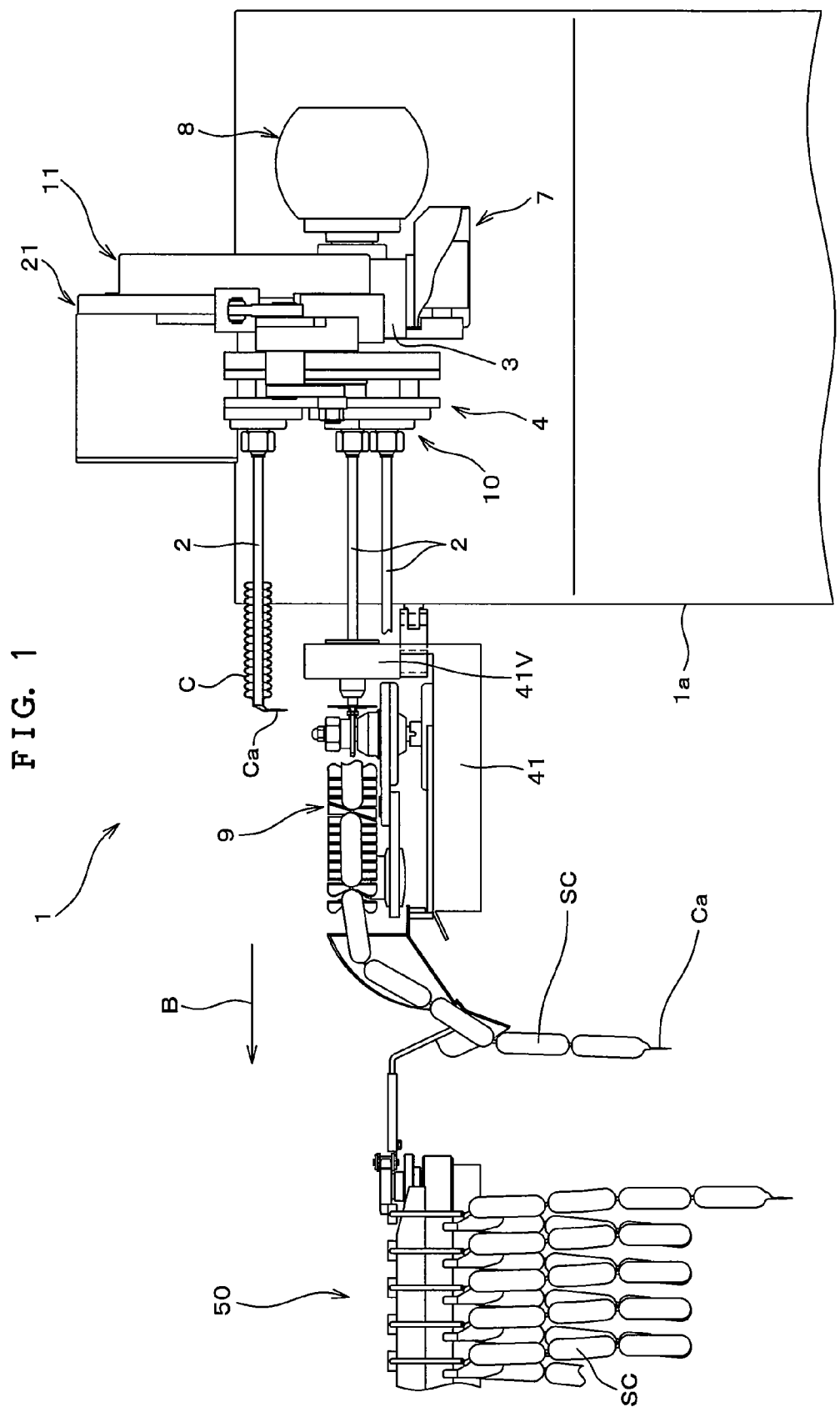
FIG. 1 is an explanatory front view of an apparatus for manufacturing chains of linked food products such as sausages with twisted portions and having a plurality of stuffing tubes in accordance with an embodiment of the invention.

Referring now to the accompanying drawings, a detailed description will be given of the embodiments of the invention. It should be noted that the invention is not limited to the embodiments described below.

First, as shown in FIGS. 1 to 4, an apparatus 1 for manufacturing chains of linked food products such as sausages with twisted portions and having a plurality of stuffing tubes in accordance with this embodiment has three stuffing tubes 2 for forming a stuffed casing SC by filling a casing C with a material M of a food product such as sausage (hereafter referred to as the "material"; see FIG. 3) such that the three stuffing tubes 2 can be interchangeably used. The three stuffing tubes 2 (2-1, 2-2, and 2-3) which are arranged in such a manner as to extend in a horizontal direction are provided on a stuffing tube moving means 4 which is supported by a housing 3 fixed to a main body housing 1a, and are adapted to be moved by the intermittent rotation of the stuffing tube moving means 4 by each predetermined amount in the direction of arrow A.

Figure 2:
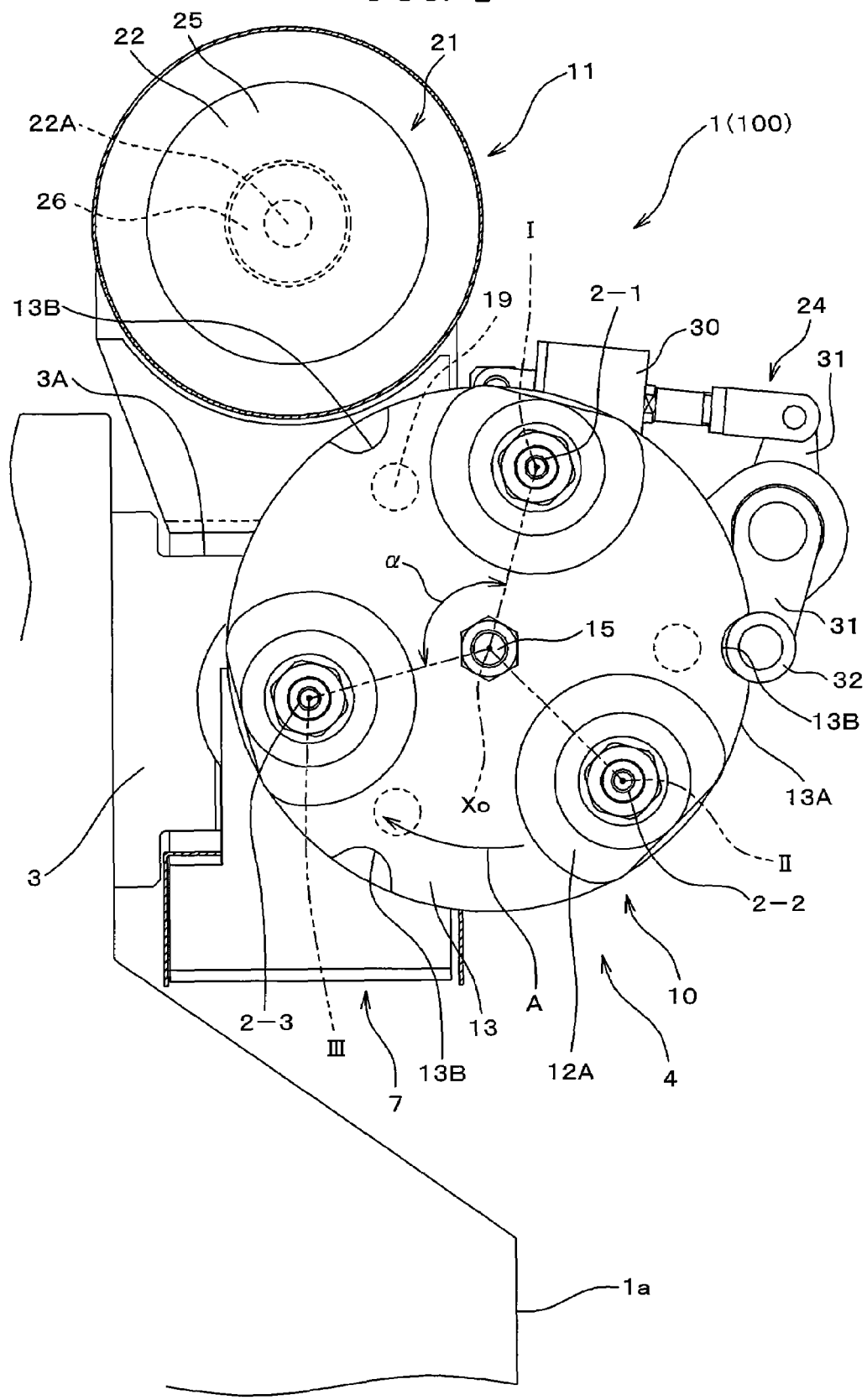
FIG. 2 is an explanatory left side view of the manufacturing apparatus shown in FIG. 1.
Figure 3:
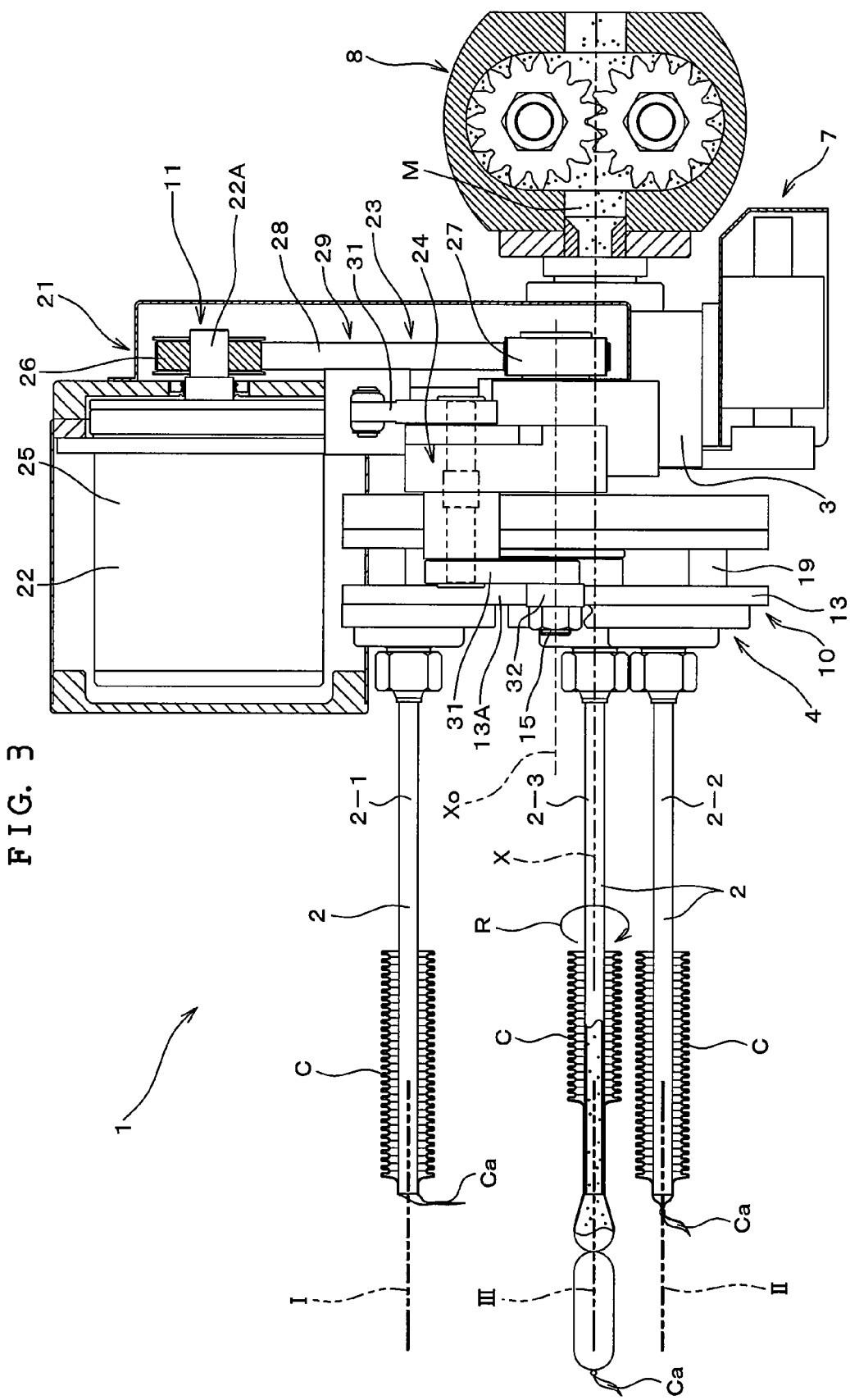
FIG. 3 is an explanatory front view illustrating the structure of essential portions in FIGS. 1 and 2.
Figure 4:
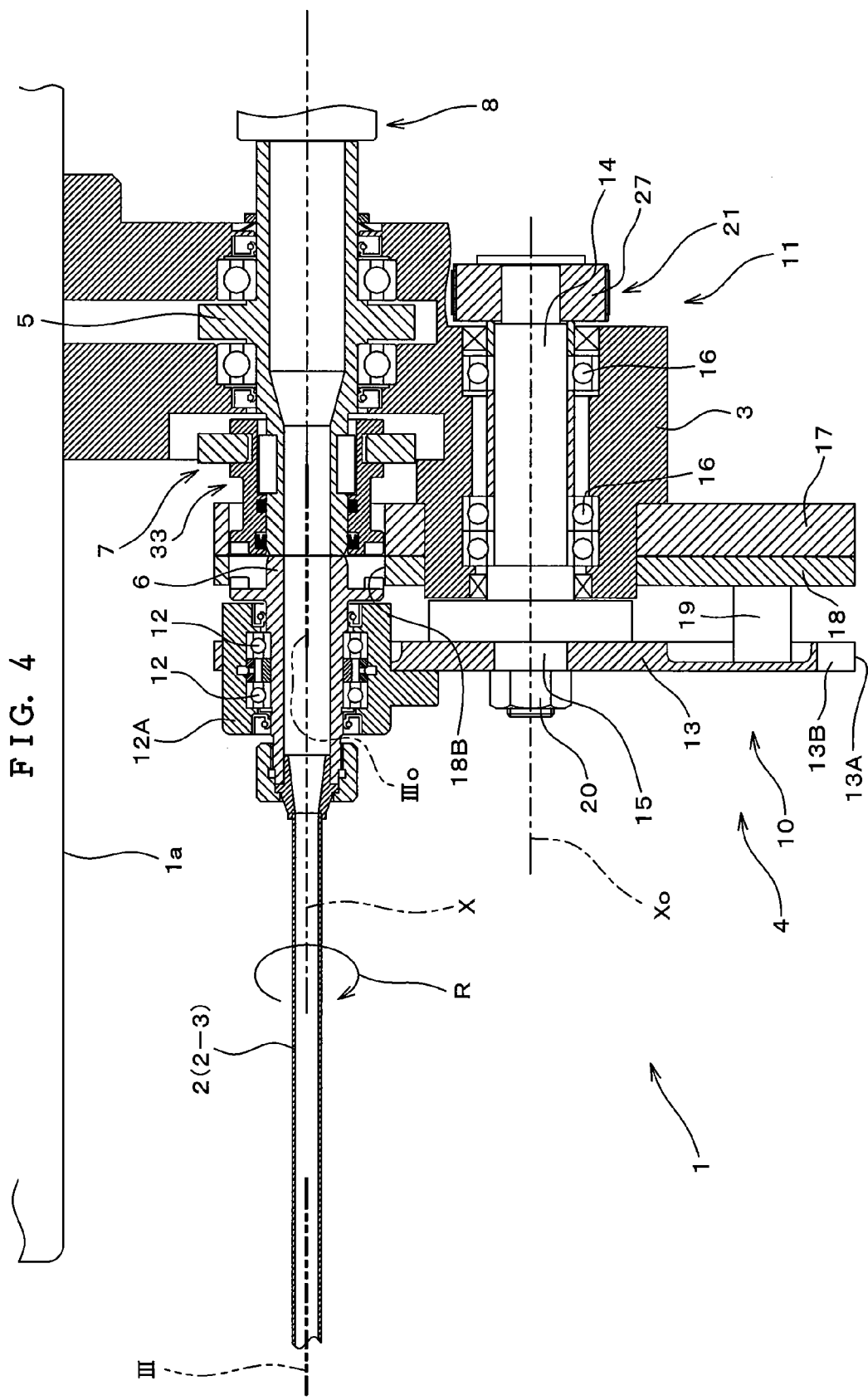
FIG. 4 is an explanatory cross-sectional view taken along a longitudinal axis X and a rotational axis Xo in FIG. 3.

In the manufacturing apparatus 1, a casing loading position I for loading the casing C on the stuffing tube 2, a leading end closing position II for closing a leading end Ca of the casing C loaded on the stuffing tube 2, and a filling position III for filling the casing C with the material M are provided at predetermined angles, i.e., at intervals of 120 degrees in this embodiment, about a rotational axis Xo of a stuffing tube support 13 which will be described later (see FIG. 2). After having rotatively moved by a predetermined amount, i.e., by 120 degrees in this embodiment, the stuffing tube moving means 4 is adapted to stop in a state in which the stuffing tubes 2-1, 2-2, and 2-3 are respectively arranged at the casing loading position I, the leading end closing position II, and the filling position III.

The manufacturing apparatus 1 is further comprised of a hollow member 5 which rotates in the direction of arrow R about a longitudinal axis X extending through the filling position III; a hollow spindle member 6 to which the stuffing tube 2 is fixed; a coupling means 7 which operates to couple the hollow member 5 and the hollow spindle member 6; a metering pump 8 for supplying the material M into the stuffing tube 2 through the hollow member 5 and the hollow spindle member 6; a link forming means 9 for forming twisted portions in the stuffed casing SC while moving the stuffed casing SC in the downstream direction (in the direction of arrow B); and a stuffed casing conveying means 50 for conveying the stuffed casing SC sent out from the link forming means 9 while forming the stuffed casing SC into loop form.

The stuffing tube moving means 4 includes a stuffing tube moving body 10 which is provided with the plurality of, i.e., in this embodiment three, hollow spindle members 6 and moves, i.e., rotatively moves in this embodiment, as well as a stuffing-tube-moving-body driving means 11 for rotatively moving the stuffing tube moving body 10 by predetermined amounts, i.e., by 120 degrees each in this embodiment.

The stuffing tube moving body 10 is provided with the three hollow spindle members 6; three bearing units 12 for rotatably supporting the respective three hollow spindle members 6; and the stuffing tube support 13 which has a substantially disk-like shape and in which the bearing units 12 are mounted by means of bearing cases 12A such that the three stuffing tubes 2 fixed to the respective three hollow spindle members 6 are arranged at 120-degree intervals about the rotational axis Xo. In the stopped state, the stuffing tube support 13 arranges the stuffing tube 2-1 at the casing loading position I, the stuffing tube 2-2 at the leading end closing position II, and the stuffing tube 2-3 at the filling position III, respectively.

Figure 5:
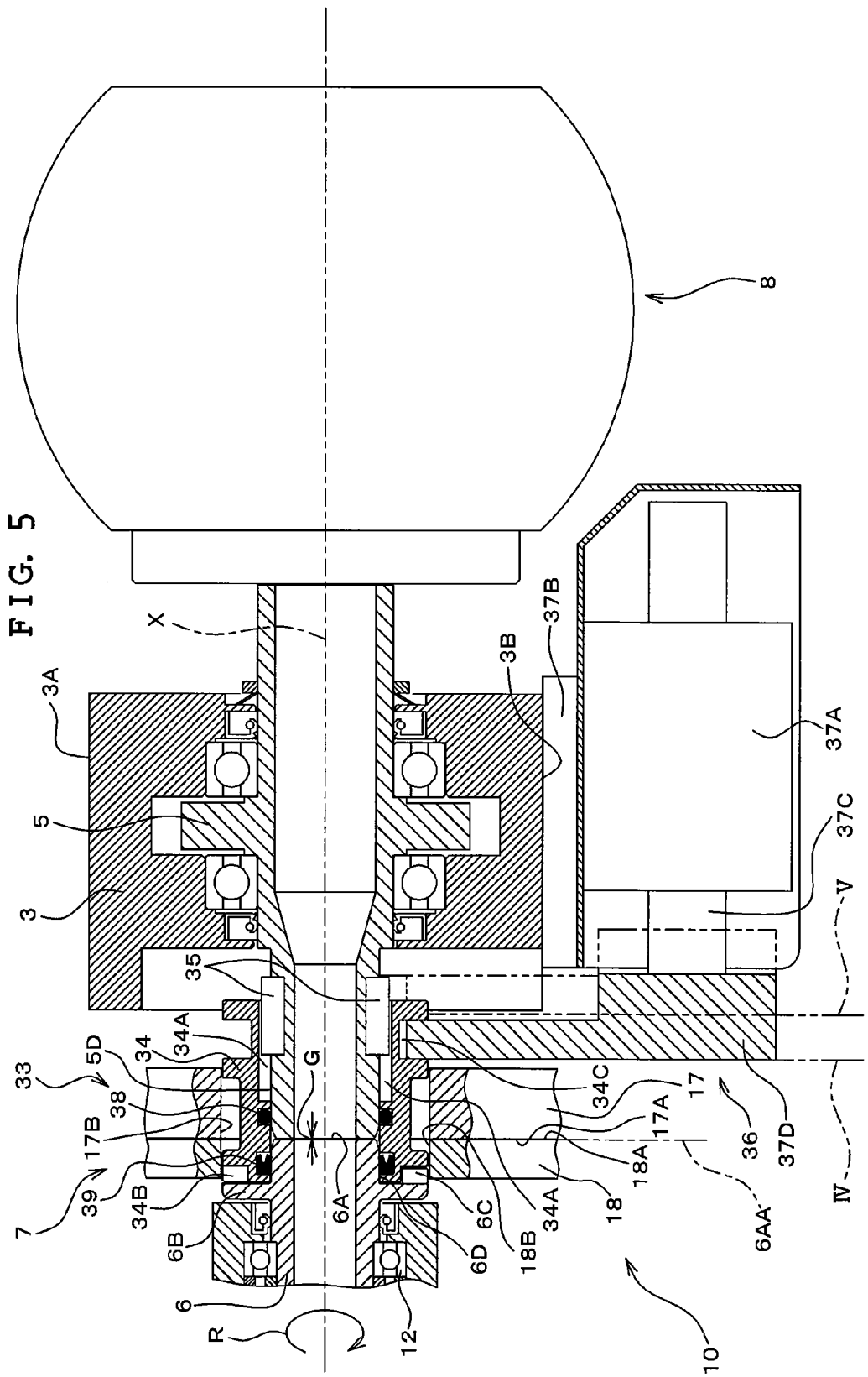
FIG. 5 is a partially enlarged explanatory front cross-sectional view of the essential portions of the structure shown in FIG. 4.

Hereafter, referring also to FIG. 5, the stuffing tube moving body 10 further has a stuffing tube moving body holder 14 for maintaining at a fixed position in the direction of the longitudinal axis X an end face 6A of the hollow spindle member 6 during the movement of the stuffing tubes 2 and during filling into the casing C. The stuffing tube moving body holder 14 has a stuffing tube support shaft member 15 for holding the stuffing tube support 13 on the rotational axis Xo of the stuffing tube support 13. The stuffing tube support shaft member 15 is rotatably supported by bearings 16 provided in the housing 3 so as to be disposed parallel to the longitudinal axis X and immovably in the direction of the longitudinal axis X.

Since the apparatus 1 has the stuffing tube moving body holder 14, the apparatus 1 becomes one in which the movement of the stuffing tubes 2 is fast, productivity is high, and the less likelihood of the leakage of the food product material M renders the apparatus hygienic. It should be noted that the moving form of the stuffing tube moving body is not limited, and may be a rotary motion or a linear reciprocating motion. The stuffing tube moving body holder is sufficient if it is capable of holding immovably in the direction of the longitudinal axis Xo the position of the stuffing tube support which undergoes rotary motion or the stuffing tube moving body which undergoes linear reciprocating motion.

The stuffing tube moving body 10 further includes a rotary seal body 18 having a planar surface 18A which comes into close proximity or contact with a surface 17A of a fixed seal body 17, which has a flat surface coming into close proximity or contact with a moving locus surface 6AA of the end face 6A of the aforementioned hollow spindle member 6 and is provided in an immovable state at a predetermined position on the housing 3. The rotary seal body 18 is attached to the stuffing tube support 13 through columns 19 in such a manner as to oppose the stuffing tube support 13 by being spaced apart therefrom in the direction of the longitudinal axis, and the fixed seal body 17 is mounted on the housing 3.

The rotary seal body 18, during its rotation in the direction of arrow A by receiving the drive of the stuffing tube moving body driving means 11, is adapted to move while its rear-end side surface 18a forms such a gap as to prevent the leakage of the material M with respect to the front-end side surface 17A of the fixed seal body 17, preferably in a state of being in contact with the surface 17A.

In a portion of the fixed seal body 17, one through hole 17B is formed on the longitudinal axis X, and the above-described hollow member 5 is projectingly disposed in that through hole 17B.

In the rotary seal body 18, three through holes 18B are formed at 120-degree intervals at positions opposing the three hollow spindle members 6 disposed through the aforementioned stuffing tube support 13, and each hollow spindle member 6 is disposed in such a manner as to project into that through hole 18B in its axial direction. The stuffing tube support 13 and the rotary seal body 18 are integrated and fixed to the stuffing tube support shaft member 15 by means of a nut 20 serving as a stuffing tube support fastening member, and are adapted to be integrally removed from the stuffing tube support shaft member 15 at the time of the cleaning of the apparatus.

The stuffing tube moving body driving means 11 is constituted by a stuffing tube support driving means 21 for rotating the stuffing tube support 13 through 120 degrees in the direction of arrow A, such that the stuffing tube 2-1 at the casing loading position I, the stuffing tube 2-2 at the leading end closing position II, and the stuffing tube 2-3 at the filling position III are respectively moved to the leading end closing position II, the filling position III, and the casing loading position I and stop there.

The stuffing tube support driving means 21 has a rotation-indexing and driving device 22 having a drive shaft 22A disposed parallel to the stuffing tube support shaft member 15; an indexing transmitting mechanism 23 for transmitting the indexed angle of the drive shaft 22A to the stuffing tube support shaft member 15; and a positioning mechanism 24 for positioning with high positional accuracy the stuffing tube support 13 which has been rotated by the portion of a predetermined angle α, i.e., 120 degrees in this embodiment, by the indexing transmitting mechanism 23. (See FIG. 3.)

The rotation-indexing and driving device 22 has a publicly known pneumatic actuator 25 which is disposed on an upper portion 3A of the housing 3 and rotates at an indexing angle of 120 degrees each. A control motor including an electric servo motor may be used instead of this pneumatic actuator 25.

The indexing transmitting mechanism 23 has a pulley 26 secured to the drive shaft 22A of the rotation-indexing and driving device 22, a pulley 27 secured to the stuffing tube support shaft member 15, and a wrapping connector mechanism 29 having a belt 28.

The aforementioned positioning mechanism 24 has a positioning roller 32 provided on a positioning arm 31 which is swung in accordance with the operation of an actuator 30 constituted by an air cylinder or the like. The arrangement provided is such that as the positioning roller 32 is fitted in a positioning groove 13B notched in an outer peripheral portion 13A of the aforementioned stuffing tube support 13, the positioning mechanism 24 positions the stop position of the stuffing tube support 13 with high accuracy and locks the stuffing tube support 13. At the stop position of this stuffing tube support 13, the hollow spindle member 6 is positioned in a state of concentricity with the hollow member 5 on the longitudinal axis X. After completion of the filling and before the indexing rotation of the stuffing tube support 13 for filling an ensuing casing C is started, the positioning mechanism 24 is operated to disengage the positioning roller 32 from the positioning groove 13B to unlock.

Since the stuffing tube support shaft member 15 is index-driven, and the outer peripheral portion 13A of the stuffing tube support 13 which is larger in diameter than the stuffing tube support shaft member 15 is positioned by the positioning mechanism 24, the positioning accuracy of the stuffing tube support 13 is high, and the axis of the hollow spindle member 6 can be arranged concentrically with that of the hollow member 5. Hence, the high-speed rotation of the hollow member 5 and the hollow spindle member 6 becomes possible, thereby improving the productivity of the apparatus. Furthermore, since the stuffing tube support driving means 21 can be made compact, the indexing of the stuffing tube support 13 at high rotational speed becomes possible, which also improves the productivity of the apparatus.

Although the rotation-indexing and driving device 22 of this embodiment is of a rotary type, a publicly known reciprocating linear actuator may be adopted instead, and this movement may be converted to a rotation indexing motion by a publicly known motion conversion mechanism to drive the stuffing tube support shaft member 15.

The coupling means 7 is so arranged as to be operated on the longitudinal axis X so as to couple the hollow member 5 and the hollow spindle member 6 after the stuffing tube moving body 10 has completed its movement by the predetermined amount. In this embodiment, the coupling means 7 has a clutch means 33, and the hollow spindle member 6 is so arranged as to be coupled with or released from the hollow member 5 by means of this clutch means 33.

The clutch means 33 has a pair of retaining pawls 6C serving as driven and engaged portions which are provided on a flange portion 6B formed integrally on an outer peripheral portion 6D of the hollow spindle member 6; a substantially hollow cylindrical clutch ring 34 serving as a tubular member fitted over an outer peripheral portion 5D of the hollow member 5; and a clutch ring driving means 36 for driving the clutch ring 34.

The clutch ring 34 is fitted over the aforementioned outer peripheral portion 5D by means of a key member 35 fitted in a key groove 34A formed on the clutch ring 34, so as to be reciprocally movable in the direction of the longitudinal axis X and unrotatable in the rotating direction. A pair of engaging pawls 34B serving as driving and engaging portions, which are capable of abutting against and engaging with the aforementioned retaining pawls 6C of the hollow spindle member 6 in the rotating direction in the direction of arrow R, are provided on an axial front end portion of the clutch ring 34.

Figure 6:
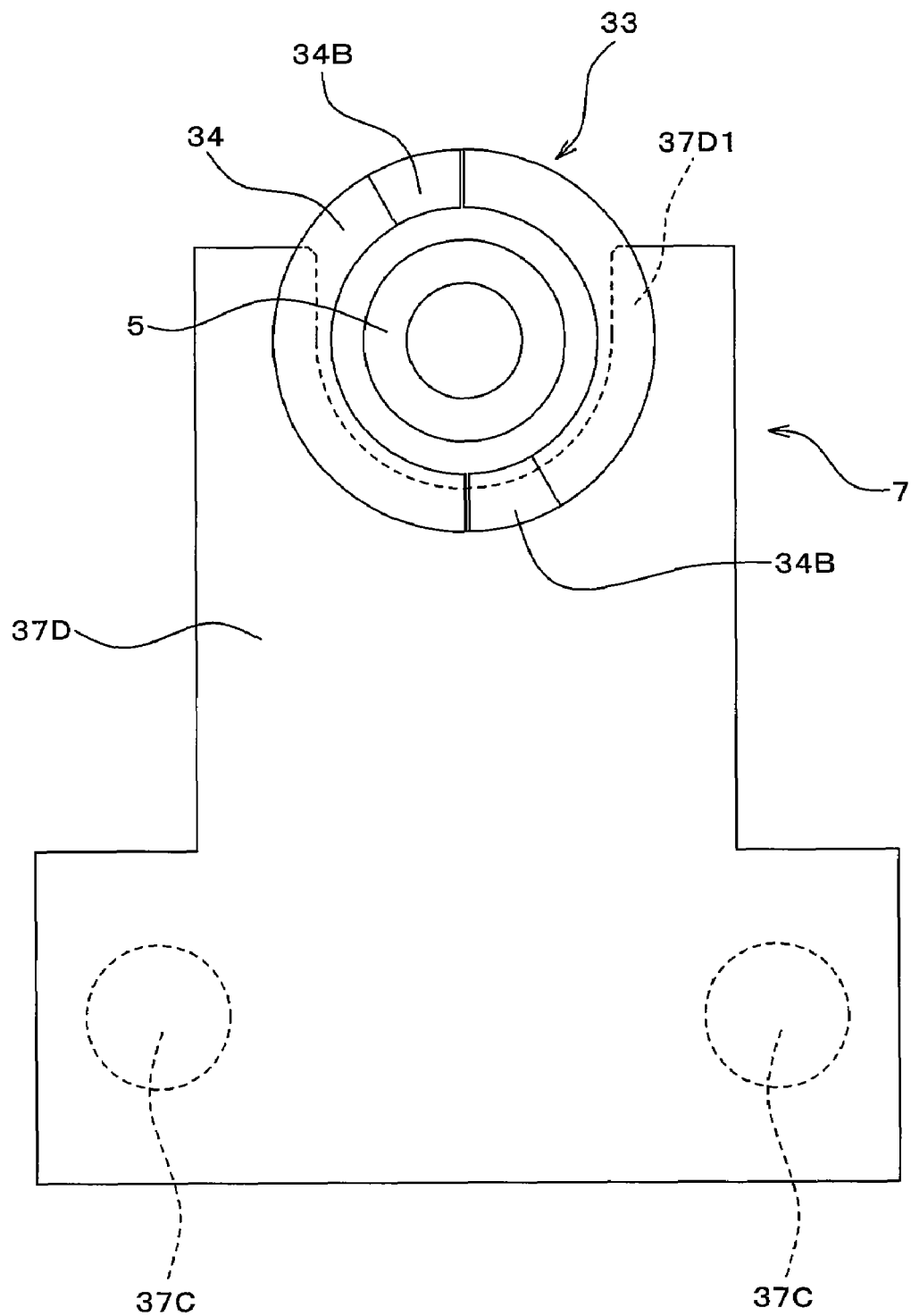
FIG. 6 is an explanatory side view of a clutch ring driving means.

The clutch ring driving means 36 has an actuator 37A constituted by an air cylinder or the like fixed to a lower portion 3B of the housing 3 by means of a plate 37B, as well as a clutch actuating plate 37D which couples an output shaft 37C of the actuator 37A and the clutch ring 34. The clutch actuating plate 37D has a front shape as shown particularly in FIG. 6, and extends in such a manner as to be suspended downward from an engaging portion 37D1 fitted substantially semicircularly to a groove portion 34C formed on the aforementioned clutch ring 34. The arrangement provided is such that as the aforementioned actuator 37A is turned on and off, the clutch actuating plate 37D is reciprocatingly moved in the direction of the longitudinal axis X, and the clutch ring 34 is correspondingly arranged to be advanced or retracted in the direction of the longitudinal axis X with respect to the aforementioned hollow spindle member 6. As a result, the aforementioned clutch ring 34 is arranged to be reciprocatingly moved between an acting position IV where it is disposed in such a manner as to straddle both the aforementioned hollow member 5 and the hollow spindle member 6 and a retracted position V where it is spaced part from the hollow spindle member 6 in the direction of the longitudinal axis X (see FIG. 5).

Since the tubular member (clutch ring 34) is used, it is possible to attain the coupling between the stuffing tube 2 and the stuffing tube moving body driving means 11 in a short time, thereby making it possible to enhance productivity. Namely, since the tubular member reciprocatingly moves in the direction of the longitudinal axis X on the hollow member 5, the movement of the tubular member is effected smoothly and speedily, with the result that the coupling and releasing between the hollow member 5 and the hollow spindle member 6 can be accomplished in a short time.

In a state in which the clutch ring 34 is advanced in the axial direction and is disposed at the acting position IV, the layout relationship is such that the engaging pawls 34B of the clutch ring 34 are abutted against the retaining pawls 6C of the hollow spindle member 6 in the rotating direction. As a result, the rotation of the hollow member 5 is transmitted to the hollow spindle member 6 by means of the clutch ring 34 to thereby rotate the stuffing tube 2 (FIG. 5).

On the other hand, when the clutch ring 34 is retracted in the axial direction and is moved to the retracted position V, the aforementioned engaging pawls 34B of the clutch ring 34 are spaced apart from the retaining pawls 6C of the hollow spindle member 6 in the direction of the longitudinal axis X (see FIG. 4), thereby allowing the indexing rotation of the stuffing tube support 13 in the direction of arrow A.

It should be noted that, before the rotation of the hollow member 5 stops, its coupling with the hollow spindle member 6 may be released, as required, by actuating the clutch means 33.

The aforementioned clutch ring 34 is provided with a first seal member 38 which comes into annular contact with the outer peripheral portion 5D of the hollow member 5 in the engaging state at the acting position IV, as well as a second seal member 39 which comes into annular contact with the outer peripheral portion 6D of the hollow spindle member 6 in the engaging state at the acting position IV. The first seal member 38 and the second seal member 39 are adapted to prevent the material M, which is pressure-fed by the metering pump 8 during filling, from leaking to the outside from a very small gap G formed by the hollow member 5 and the hollow spindle member 6.

The coupling means 7 is provided independently of the stuffing tube moving body 10, and after the stuffing tube moving body 10 has completed the movement by a predetermined amount α, the coupling means 7 is operated to couple the hollow member 5 and the hollow spindle member 6. Since the stuffing tube moving body 10 is not involved in the coupling between the hollow member 5 and the hollow spindle member 6, the stuffing tube moving body 10 can be moved at high speed. It should be noted that the coupling of this apparatus is not limited to a means for mechanically fastening the hollow member 5 and the hollow spindle member 6. For example, it is possible to use a means for coupling the hollow member 5 and the hollow spindle member 6 through a magnetic force.

Next, a description will be given of the operation of the manufacturing apparatus 1. Upon completion of the stuffing of the casing C, a below-mentioned motor 47-1 is stopped, followed by the stopping of the rotation of the hollow member 5 and the rotation of the hollow spindle member 6 in a state of being coupled to the hollow member 5 by the clutch ring 34. Next, the clutch ring 34 is moved so as to be retracted to the retracted position V, and the lock of the stuffing tube support 13 is released. The link forming means 9 is then moved in the downstream direction (in the direction of the arrow B) to be moved away from the stuffing tube 2-3, and the indexing rotation of the stuffing tube support 13 is started.

When the stuffing tube support 13 finishes the indexing rotation of 120 degrees, the stuffing tube support 13 is positioned and locked, and the movement of an ensuing casing C to the filling position III is completed. When the link forming means 9 is returned to its original position, the clutch means 33 is then operated to couple the hollow member 5 and the hollow spindle member 6, the motor 47-1 is started to rotate the hollow member 5, and its rotation is transmitted to the hollow spindle member 6. At the same time, the metering pump 8 is operated to effect the stuffing of the casing C by the stuffing tube 2 which has been rotated, and a linked stuffed casing SC with twisted portions SCa is manufactured.

Figure 10:
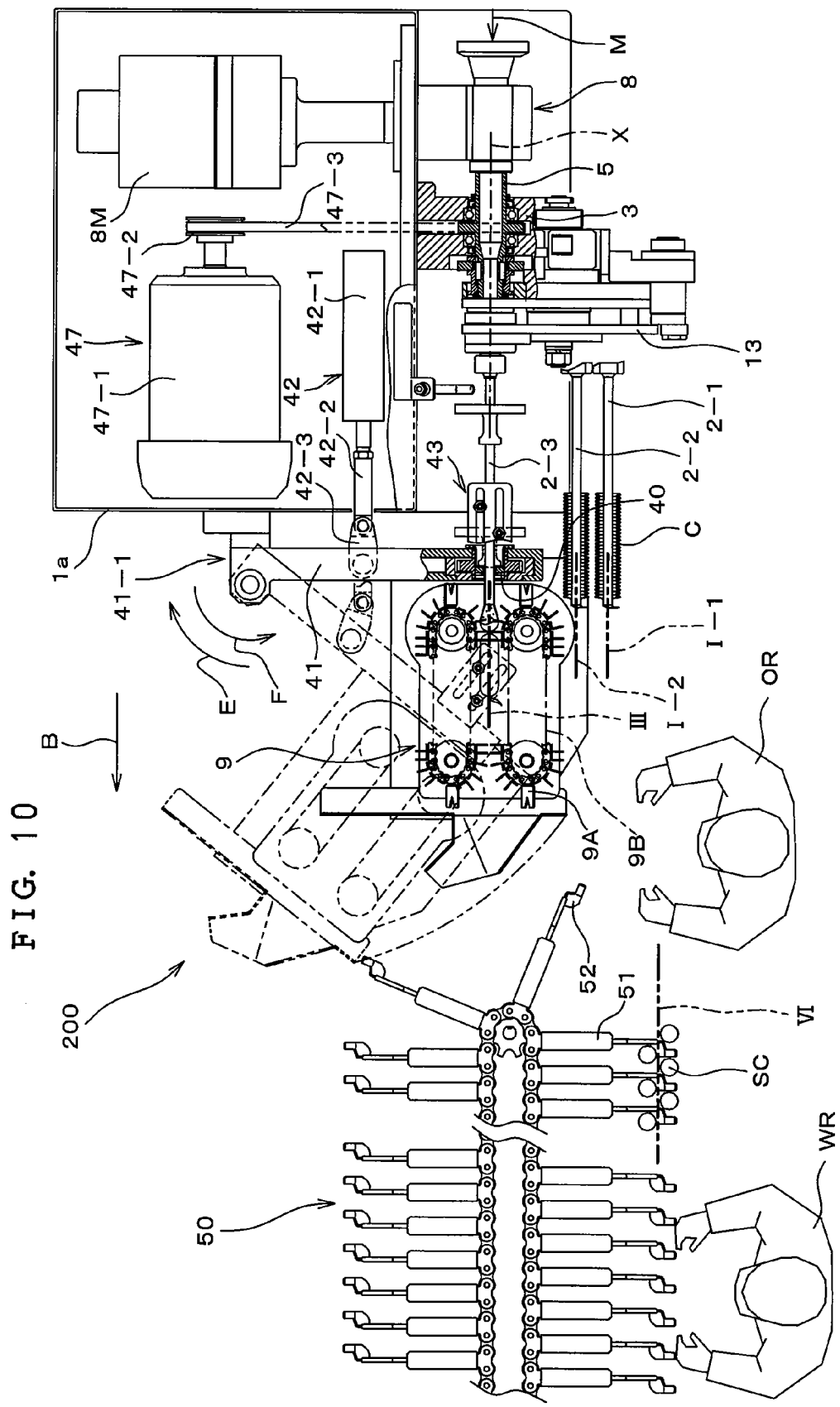
FIG. 10 is an explanatory plan view of FIG. 9.
Figure 11:
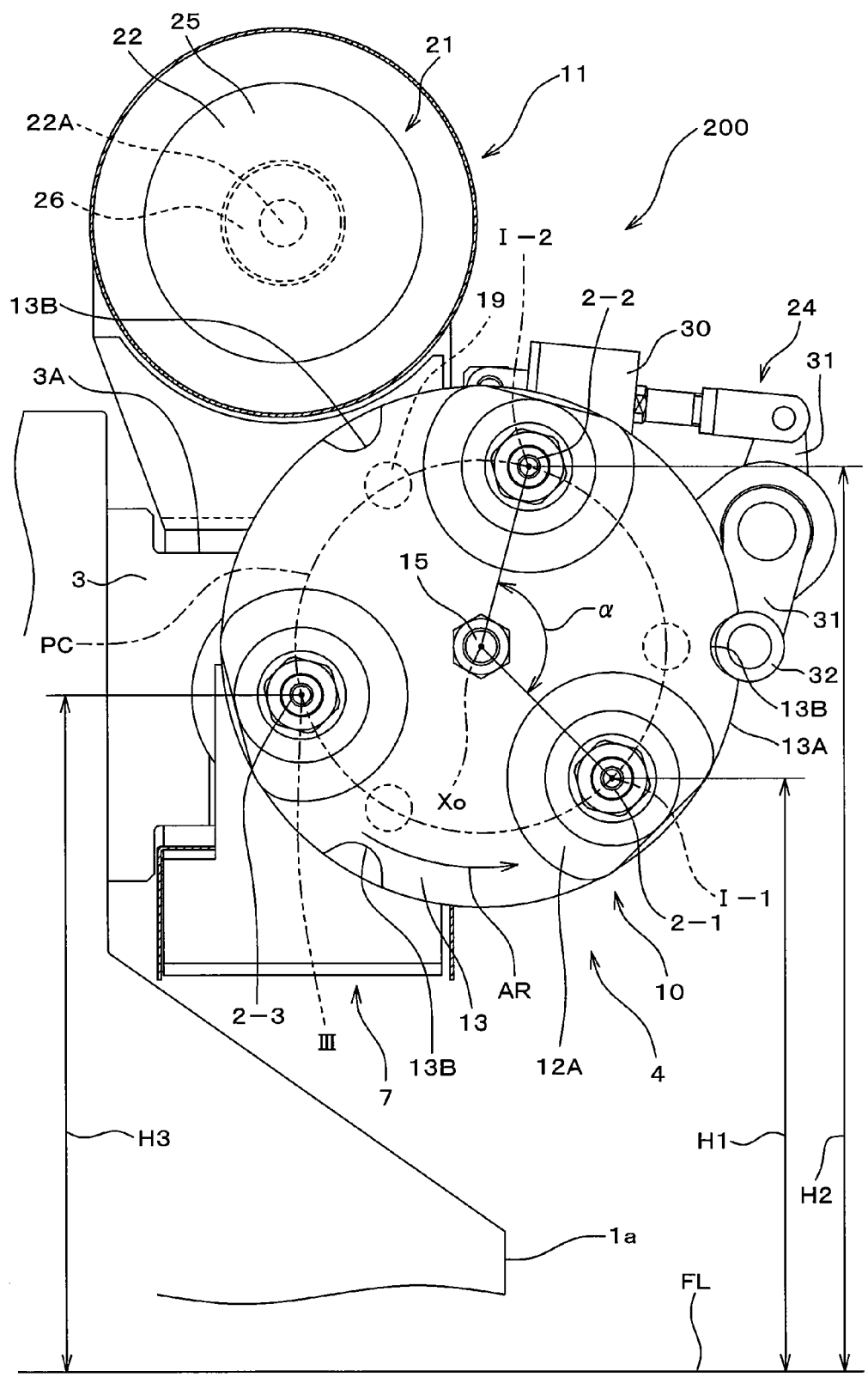
FIG. 11 is an explanatory front view of an enlarged portion of FIG. 9.

The stuffed casing SC formed in loop form, which is being conveyed by the stuffed casing conveying means 50, is subjected to necessary processing by an operator OR (see FIG. 10). The operator OR, while performing a processing operation with respect to the stuffed casing SC, as will be described later, performs the loading operation of the casing C and the closing operation of the leading end Ca of the casing C loaded on the stuffing tube 2. As for the closing of the leading end, the casing at the leading end Ca is tied manually, or closed by the operator OR by using a casing leading end closing means which will be described later. As the casing leading end closing means, the casing C at the leading end Ca is heat sealed by using, for example, a casing heat sealing means.

Next, referring to FIG. 7, a description will be given of a manufacturing apparatus 100 in which the above-described apparatus 1 is provided with a casing loading means and a casing leading end closing means. Reference numeral 101 denotes the casing loading means provided at the casing loading position I to load the casing C onto the stuffing tube 2-1, and reference numeral 102 denotes the casing leading end closing means provided at the leading end closing position II to close the leading end Ca of the casing C loaded on the stuffing tube 2-2. However, this apparatus 100 may be provided with either one of the casing loading means 101 and the casing leading end closing means 102.

The casing loading means 101 is an apparatus for automatically loading a natural intestine casing C or a shirred artificial casing C onto the stuffing tube 2-1.

The casing leading end closing means 102 has a casing heat sealing means 103 for heat sealing the leading end Ca of the loaded casing C. Although the heat sealing of the casing C requires a relatively long time, since the casing C can be heated by the casing heat sealing means 103 while the stuffing tube 2-2 is stopped at the leading end closing position II, i.e., while the casing C is being filled at the filling position III, it is possible to form a closed casing leading end Ca from which the material M does not leak.

Since the casing heat sealing means 103 is provided for heat sealing the leading end Ca of the casing C loaded on the stuffing tube 2-2 at the leading end closing position II, it is possible to spend the same time as the time required for the stuffing of one casing C on the leading end processing operation, so that the casing can be heated with the heating time necessary for the formation of a heat sealed portion. As the casing heat sealing means, it is possible to adopt a hot water immersing device, a laser generator, a tongs (pincher) device, an impulse sealer, a high-frequency sealer, a heat sealer, and the like.

As the casing leading end closing means 102, it is possible to adopt, for example, a conventionally known clipping device using clips or an automatic string tying device using a string, in addition to the casing heat sealing means 103. Still alternatively, the leading end closing may be effected by applying an adhesive, including molten gelatin, to the leading end Ca by an applicator.

Each of the casing loading means 101 and the casing leading end closing means 102 may be operated manually or may be operated automatically. In any one of the above-described forms in the apparatus 100, it is possible to attain a reduction of the operating time.

Thus, with the apparatus 100 provided with the casing loading means 101 and the casing leading end closing means 102, the casing loading operation and the casing leading end closing operation can be simultaneously carried out automatically during stuffing, so that the apparatus becomes an automated, highly productive apparatus. Even if the apparatus 100 is provided with only one means of the casing loading means 101 and the casing leading end closing means 102, as described above, the apparatus is automated and becomes a highly productive apparatus.

In the above-described apparatus 1, the stuffing tubes 2-1, 2-2, and 2-3 are respectively arranged to stop in a state of being arranged at the casing loading position I, the leading end closing position II, and the filling position III. However, the apparatus 1 may also be formed as an apparatus 200 which does not perform the leading end closing operation at the leading end closing position II, as will be described below.

Referring to FIGS. 8 to 11 and, as required, also to the embodiment drawings, already referred to above, of the apparatus 1, a description will be given of the apparatus 200. In the apparatus 200, the stuffing tubes 2-1, 2-2, and 2-3 are provided on the stuffing tube moving body 10 at 120-degree intervals on a circumference PC about the rotational axis Xo. The stuffing tube 2-3 is located and remains at a standstill on the longitudinal axis X, i.e., at the filling position III, while the stuffing tubes 2-1 and 2-2 are respectively located and remain at a standstill at two casing loading positions I, i.e., a first casing loading position I-1 and a second casing loading position I-2. The stuffed casing conveying means 50 for conveying in a state of being suspended in loop form the stuffed casing SC formed by the stuffing tube 2-3 is disposed downstream of the filling position III.

Reference character OR denotes an operator who loads the casings C, i.e., the natural intestine casings C in this case, onto the stuffing tube 2-1 at a first casing loading position I-1 and the stuffing tube 2-2 at a second casing loading position I-2, respectively. This operator OR is also in charge of at least the end processing of the stuffed casings SC (the leading end closing processing and/or the trailing end closing processing) among the required processing operations with respect to the stuffed casings SC, which will be described later. Reference character WR denotes a processing staff member which is assigned to carry out required processing which could not be carried out by the operator OR among the required processing operations with respect to the stuffed casings SC. Accordingly, this processing staff member WR is not an essential staff member.

The metering pump 8 serving as a material supplying means has a servo motor 8M which turns on and off the operation of the pump 8. The motor 8M is arranged to effect starting and stopping on the basis of a stop signal 44 from a material-supply-stop commanding means 43 which will be described later. The metering pump 8 supplies the material M, which has been pressure fed from an unillustrated publicly known material pump, to the stuffing tube 2-3 in a filling step, and stops its supply in a non-filling step. The material M is discharged from the stuffing tube 2-3 into the casing C. The material supplying means may be constituted by the aforementioned publicly known material pump by excluding the metering pump 8 of this embodiment.

The link forming means 9 is mounted on a braking member moving body 41 which is attached to the main body housing 1*a* by means of a hinge mechanism 41-1. The link forming means 9 has a pair of chains 9B having pincher members 9A for forming twisted portions SCa by constricting the outer periphery of the stuffed casing SC. The twisted portion SCa is formed by the rotation of the stuffing tube 2-3, as will be described later, and the stuffed casing SC is connected by the twisted portions SCa and is thereby formed into a chain form.

The stuffing tube support 13 is adapted to effect intermittent rotation through a predetermined angle α, i.e., by 120 degrees each in this case, in the direction of arrow AR about the rotational axis Xo, to thereby circulatingly move the stuffing tubes 2-2 and 2-1 in the direction of arrow AR sequentially to the filling position III. The stuffing tube 2-2, which is at a standstill at the second casing loading position I-2 located upwardly of the stuffing tube 2-3 at the filling position III, moves downwardly (in the direction of arrow AR) and stops at the filling position III. The hollow spindle member 6, to which the stuffing tube 2-3 at the filling position III is mounted, communicates with the hollow member 5 (see FIG. 4).

The apparatus 200 may comprise one stuffing tube 2 at the filling position III and three or more stuffing tubes 2 at three or more casing loading positions I, i.e., four or more stuffing tubes 2, or may comprise one stuffing tube 2 at the filling position III and one stuffing tube 2 at the casing loading position I, i.e., two stuffing tubes 2. Since the apparatus 200 is provided with the stuffed casing conveying means 50, insofar as the stuffing tube support 13 is provided with at least two stuffing tubes 2, even if the stuffing tube support 13 rotates in either the direction of arrow A (see FIG. 2) or the direction of arrow AR, it is possible to reduce the idle time of the apparatus 200 which can occur due to the processing operation of the stuffed casing SC.

Although the aforementioned rotation-indexing and driving device 22 is disposed on the upper position 3A of the housing 3, the stuffing-tube-moving-body driving means 11 may alternatively be constructed by being provided with a rotation-indexing and driving device of another form disposed on the longitudinal axis Xo of the stuffing tube support shaft member 15. The rotation-indexing and driving device may be the pneumatic actuator 25 or a control motor such as an electric servo motor.

Although each of the apparatus 1, the apparatus 100, and the apparatus 200 has the stuffing tube moving body 10 which rotates about the rotational axis Xo through predetermined angles, an arrangement may alternatively be provided such that the stuffing tube moving means 4 has a stuffing tube moving body which alternately reciprocatingly rotates through a predetermined angle in the direction of arrow A and the direction of arrow AR. In this form, two stuffing tubes 2 are provided on the stuffing tube moving body 10 at 180-degree intervals on a circumference PC about the rotational axis Xo.

Reference numeral 40 denotes an annular braking member having a hole portion whose inner peripheral edge is caused to come into contact with the casing C loaded on the stuffing tube 2-3 at the filling position III. The annular braking member 40 is provided inside a vertical portion 41V of the braking member moving body 41 (see FIG. 1) having a right-angled shape. The braking member 40 rotates the stuffed casing SC by rotating together with the stuffing tube 2-3.

Reference numeral 42 denotes a braking-member disengaging driving means, which has an actuator 42-1 provided inside the main body housing 1*a* and a coupling rod member 42-2 which is reciprocatingly moved by the actuator 42-1. The coupling rod member 42-2 is passed through the main body housing 1*a* and is coupled to the braking member moving body 41 through a link member 42-3. As the coupling rod member 42-2 is reciprocatingly moved in the direction of its longitudinal axis, the braking member moving body 41 effects the reciprocating rotation about the hinge mechanism 41-1 in the direction of arrow E and the direction of arrow F. The braking member 40 provided in the braking member moving body 41 is disengaged from the stuffing tube 2-3 by moving in the direction of arrow E, thereby permitting the rotative movement of the stuffing tube moving means 10 through the predetermined angle α.

The apparatus 200 may be provided with, instead of the braking member moving body 41 having the above-described form, a braking member moving body mounted in the main body housing 1*a* so as to permit rectilinear reciprocating motion. In this case, the braking-member disengaging driving means is coupled to the braking member moving body so as to reciprocatingly move the braking member moving body along the longitudinal direction of the stuffing tube 2-3. In this form as well, the braking member 40 is disengaged from the stuffing tube 2-3.

Reference numeral 43 denotes the material-supply-stop commanding means for transmitting the stop signal 44 for stopping the supply of the material by the material supplying means 8, by detecting a trailing end Cb of the casing C loaded on the stuffing tube 2. The material-supply-stop commanding means 43 has two detection sensors 43-2 and 43-3 mounted on a bracket 43-1 secured to the braking member moving body 41, a casing pushing collar 43-4 for pushing the trailing end Cb of the casing C, and an air nozzle 43-5 for injecting air for pushing the casing pushing collar 43-4 against the trailing end Cb. The length of the casing C loaded on the stuffing tube 2-3 becomes shorter as the casing C is gradually filled with the material, and its trailing end Cb gradually approaches a distal end 2*a* of the stuffing tube 2. The detection sensors 43-2 and 43-3 detect the casing pushing collar 43-4 which pushes the trailing end Cb which approached the distal end 2*a* to terminate the stuffing of the casing C by the stuffing tube 2-3. Thus, the material-supply-stop commanding means 43 of this apparatus 200 indirectly detects the trailing end Cb of the casing C through the casing pushing collar 43-4, and its construction is substantially identical to that of a device disclosed in Republished Patent No. WO 02/007524.

The material-supply-stop commanding means is not limited to the above-described construction insofar as it is a means for transmitting the stop signal 44 for stopping the supply of the material by the material supplying means 8, by detecting the state of consumption of the casing C loaded on the stuffing tube 2. For example, the material-supply-stop commanding means may be constructed by a means which uses any one of methods including, among others, a method in which the position of the trailing end Cb of the casing C on the stuffing tube 2 is directly detected and a detection signal is transmitted, a method in which the presence or absence of the casing C on the stuffing tube 2 is detected and a detection signal is transmitted, a method in which the presence or absence of the stuffed casing is detected and a detection signal is transmitted, and a method in which the material discharged from the stuffing tube is detected and a detection signal is transmitted. As the material-supply-stop commanding means, it is possible to use a device disclosed in, for example, Republished Patent No. WO 00/47053, EP 1 623 628 A2, EP 1 647 193 A1, and WO 02/28191 A2.

Reference numeral 46 denotes a control means having a programmable controller (PLC). By using as a starting point the reception of the stop signal 44 from the material-supply-stop commanding means 43, the control means 46 transmits a signal S1 to the material supplying means 8, a signal S2 to the stuffing-tube-moving-body driving means 11, and a signal S3 to the braking-member disengaging driving means 42. The control means 46 thereby controls the material supplying means 8, the stuffing-tube-moving-body driving means 11, and the braking-member disengaging driving means 42 so that they are operated in a predetermined sequence. Thus, the stuffing-tube-moving-body driving means 11 and the braking-member disengaging driving means 42 are constructed such that their operation is controlled after the transmission of the stop signal 44 by the material-supply-stop commanding means 43. It should be noted that the control means 46 is not limited to the electrical type, and may be a pneumatic type or a mechanical type using a timing cam.

Reference numeral 47 denotes a hollow-member rotatively driving means for rotating the hollow member 5 about the longitudinal axis X, and the hollow-member rotatively driving means 47 is provided in interiors of the main body housing 1*a* and the housing 3 secured to the main body housing 1*a*. The hollow-member rotatively driving means 47 has a motor 47-1, a pulley 47-2, and a belt 47-3, and the rotation of the motor 47-1 is transmitted to the hollow member 5.

The stuffed casing conveying means 50 has a multiplicity of suspending members 51, i.e., in this example hooks 52, which move by suspending the stuffed casing SC spirally (in loop form) or in an alternately bilaterally suspending manner (in a saddling manner). Although the stuffed casing conveying means 50 is adapted to operate and convey the stuffed casing SC during the filling step, and is adapted to stop its operation during the non-filling step, the stuffed casing conveying means 50 may be operated during the non-filling step as well. The casing loading positions I-1 and I-2 are closer to a moving path VI of the hooks 52 with the stuffed casing SC suspended therefrom than the filling position III. As a result, the operator OR is able to easily carry out the loading of the casings C onto the stuffing tubes 2-1 and 2-2 at the first casing loading position I-1 and the second casing loading position I-2 as well as the required processing of the stuffed casing SC suspended from the hooks 52.

Reference characters H1, H2, and H3 show the respective heights from a floor line FL to the stuffing tubes 2-1 and 2-2 at the first and second casing loading positions I-1 and I-2 and the stuffing tube 2-3 at the filling position III, and reference character H4 shows the height from the floor line FL to a suspending portion 52A of the hook 52. Since the processing time of the stuffed casing SC is often greater than the loading time of the casing C, the height of the hook 52, H4, is set to a height for facilitating the processing operation of the stuffed casing SC by the operator OR. The height of the stuffing tube 2-2, H2, at the second casing loading position I-2 is higher than the height of the hook 52, H4, and can lower the operating efficiency in loading the casing C by the operator OR. Since the stuffing tube 2-1 is set at the height H1 lower than the height H2 of the stuffing tube 2-2, and is located on the side closer to the operator OR than the stuffing tube 2-2, the stuffing tube 2-2 is at a desirable position for the casing loading operation by the operator OR.

In the apparatus 200, since the stuffing tube moving body 10 rotates in the direction of arrow AR, the stuffing tube 2-2, which support the casing C loaded at the first casing loading position I-1 where loading is easy, has been moved to and stopped at the second casing loading position I-2. Hence, the operator OR is always able to load the casing onto the empty stuffing tube 2-1 which is on standby at the first casing loading position I-1 where loading is easy. As a result, it is possible to load in advance two casings C onto two reserve stuffing tubes 2-1 and 2-2 during the filling step.

As the required processing with respect to the stuffed casing SC, it is possible to cite leading end closing, trailing end closing, untwisting processing, and puncture processing. The variation of the time required for such processing by the manual operation by the operator OR and the processing staff member WR, which is performed with respect to the stuffed casing SC, is large particularly in the case where the casings C are natural intestine casings. The amount of processing operation is small in the stuffing of high-quality natural intestine casings, and the amount of processing operation is large in the stuffing of low-quality natural intestine casings.

The control means 46 controls the operation of the apparatus 200 in the following procedure. First, the metering pump 8 is stopped on the basis of a signal representing the detection of the trailing end Cb of the casing C. Then, the operation of the link forming means 9, the stuffed casing conveying means 50, and the stuffing tube 2-3 is stopped. After the braking member 40 is disengaged from the stuffing tube 2-3, the stuffing tube support 13 is index-rotated to move the stuffing tube 2 with an ensuing casing C loaded thereon to the filling position III. After the braking member is fitted on the stuffing tube 2-3, ensuing filling is started. It should be noted that this operation and sequence can be altered, as required.

Since the above-described operation is carried out in the apparatus 200, even if the filling is finished before the processing operation of the stuffed casing SC by the operator OR is completed, an ensuing filling operation using the two natural intestine casings C loaded in advance on the two stuffing tubes 2-1 and 2-2 is sequentially started automatically.

Next, a description will be given of the method of manufacturing chains of linked food products such as sausages by using the apparatus 200.

A casing C is already loaded on the stuffing tube 2-2 at the second casing loading position I-2.

The operator OR loads another casing C onto the empty stuffing tube 2-1 at the first casing loading position I-1.

Even if the filling operation using the stuffing tube 2-3 is finished during the stuffed casing processing operation, the operator OR continues the stuffed casing processing operation.

When unoccupied with the stuffed casing processing operation, the operator OR performs the loading of casings onto the stuffing tubes 2-1 and 2-2.

In the manufacture of sausages using natural intestine casings C in which the variation of their quality is large, this manufacturing apparatus 200 is high in the operation rate since the frequency of loading of casings onto the stuffing tube 2-1 where the loading is facilitated is high, and the frequency of loading of casings onto the stuffing tube 2-2 where the loading is less facilitated than on the stuffing tube 2-1 is low. Further, since the casings C are frequently set on the both two reserve stuffing tubes 2-1 and 2-2, the idle time of production is reduced. It is possible to start the stuffing of an ensuing casing during the processing operation of the stuffed casing SC suspended from the stuffed casing conveying means 50, so that productivity is high.

As described above, the hollow member 5 of the apparatus 1 shown in FIGS. 1 to 6 is so arranged as to rotate about the longitudinal axis X in the direction of arrow R in the filling step. However, this hollow member 5 may be so arranged as to be disposed on the longitudinal axis X in a fixed (non-rotational) state without undergoing rotation about the longitudinal axis X in the filling and non-filling steps. In the manufacturing apparatus in accordance with an unillustrated other embodiment having this hollow member 5 which does not rotate, the hollow member 5 does not have the function of rotatively driving the hollow spindle member 6, and merely functions as a conduit for introducing the material M into the hollow spindle member 6. The hollow spindle member 6 in this other embodiment has a driven gear portion formed on its outer periphery. This driven gear portion of the hollow spindle member 6, to which the stuffing tube 2-3 at a standstill at the loading position I is fixed, meshes with a drive gear provided on the main body housing 1a, and is rotated about the longitudinal axis X in the direction of arrow R by the drive gear. In the manufacturing apparatus of this other embodiment, the coupling means 7 in the apparatus 1 is not provided.

Next, referring to FIGS. 12 to 17, a description will be given of the casing loading means 110 which is used by being provided in the apparatus 100. The casing loading means 110 in accordance with this embodiment is for loading onto the stuffing tube 2 an artificial casing C (hereafter, the casing C) including a shirred cellulose casing or collagen casing of an elongated tubular shape. The casing C is a stick consisting of a multiplicity of folds which have been compressed closely in bellows form in the longitudinal direction. The casing loading means 110 is disposed downstream of the stuffing tube 2-1 which is at a standstill at the loading position I, and along a longitudinal axis X1 (see FIG. 7 as well) of the stuffing tube 2-1 which extends downstream (in the direction of the arrow B) beyond a leading end portion 2-1 of the stuffing tube 2-1. If the shirred casing C of a closed end type is used (FIG. 15(C)), the leading end closing processing is not carried out with respect to the casing C on the stuffing tube 2-2 which is at a standstill at the leading end closing position II.

Figure 15:
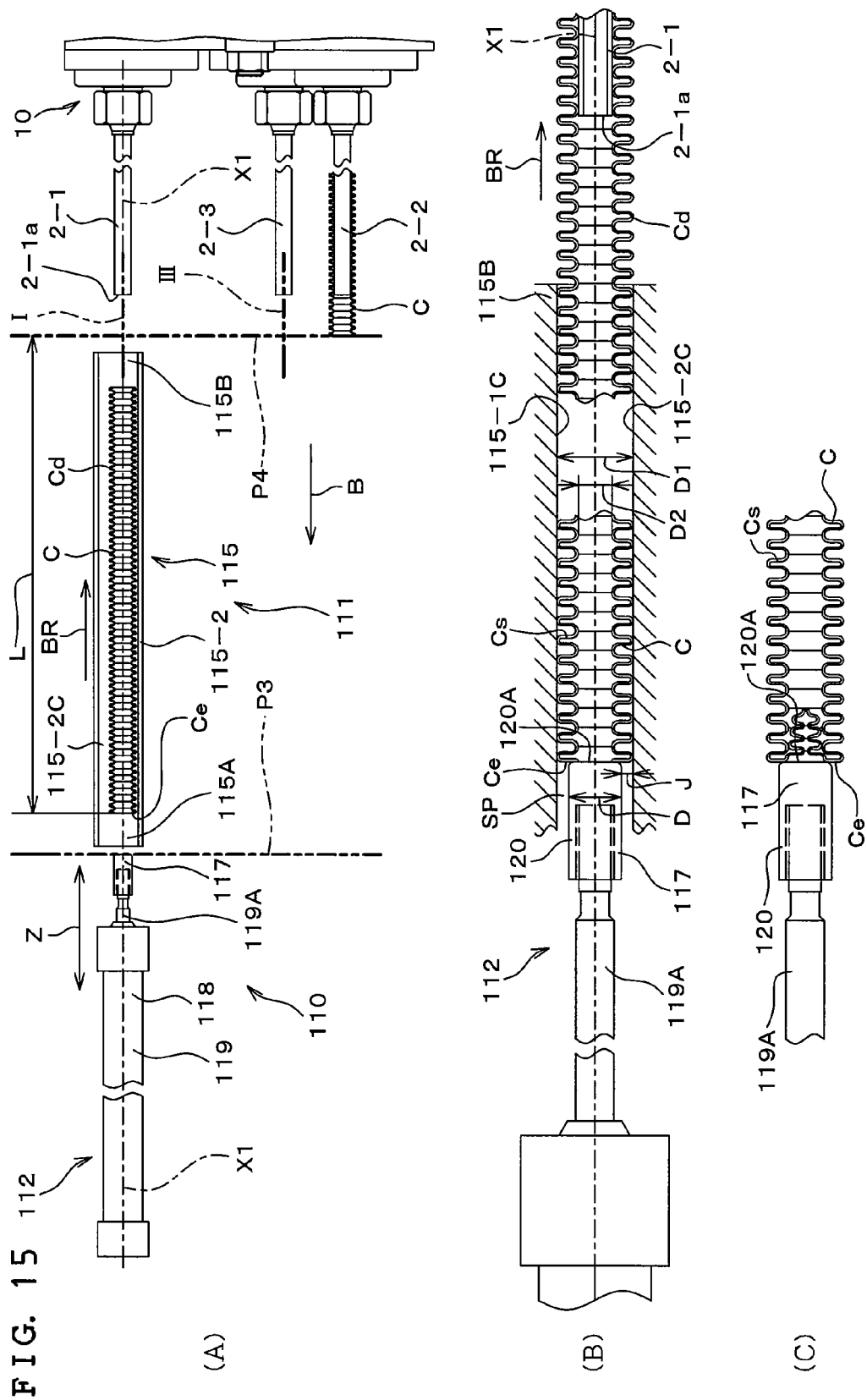
FIG. 15 is an enlarged explanatory view of the casing loading means, in which the part (A) is an enlarged explanatory front elevational view of FIG. 12, the part (B) is a partial enlarged explanatory cross-sectional view taken along line i-i in FIG. 16, and the part (C) is a partial enlarged front elevational view illustrating a casing pushing/advancing member abutting against a closed-end casing.

Referring mainly to FIG. 15, the casing loading means 110 has a casing holding means 111 for positioning the casing C at a predetermined position on the longitudinal axis X downstream (in the direction of the arrow B) of the stuffing tube 2-1, as well as a casing pushing/advancing means 112 for pushing and advancing toward the leading end portion 2-1a of the stuffing tube 2-1 (in the direction of arrow BR) the casing C being held by the casing holding means 111. The arrangement provided is such that as a front end portion Ce of the casing C being held by the casing holding means 111 is pushed and advanced by the casing pushing/advancing means 112, the casing C is thereby moved in its longitudinal direction on the longitudinal axis X, and the casing C, while being fed out from the casing holding means 111, is delivered onto the stuffing tube 2-1, the pushing and advancing by the casing pushing/advancing means 112 being further continued to allow the casing C delivered onto the stuffing tube 2-1 to slide in the direction of the arrow BR, thereby loading the casing C onto the stuffing tube 2-1.

Figure 14:
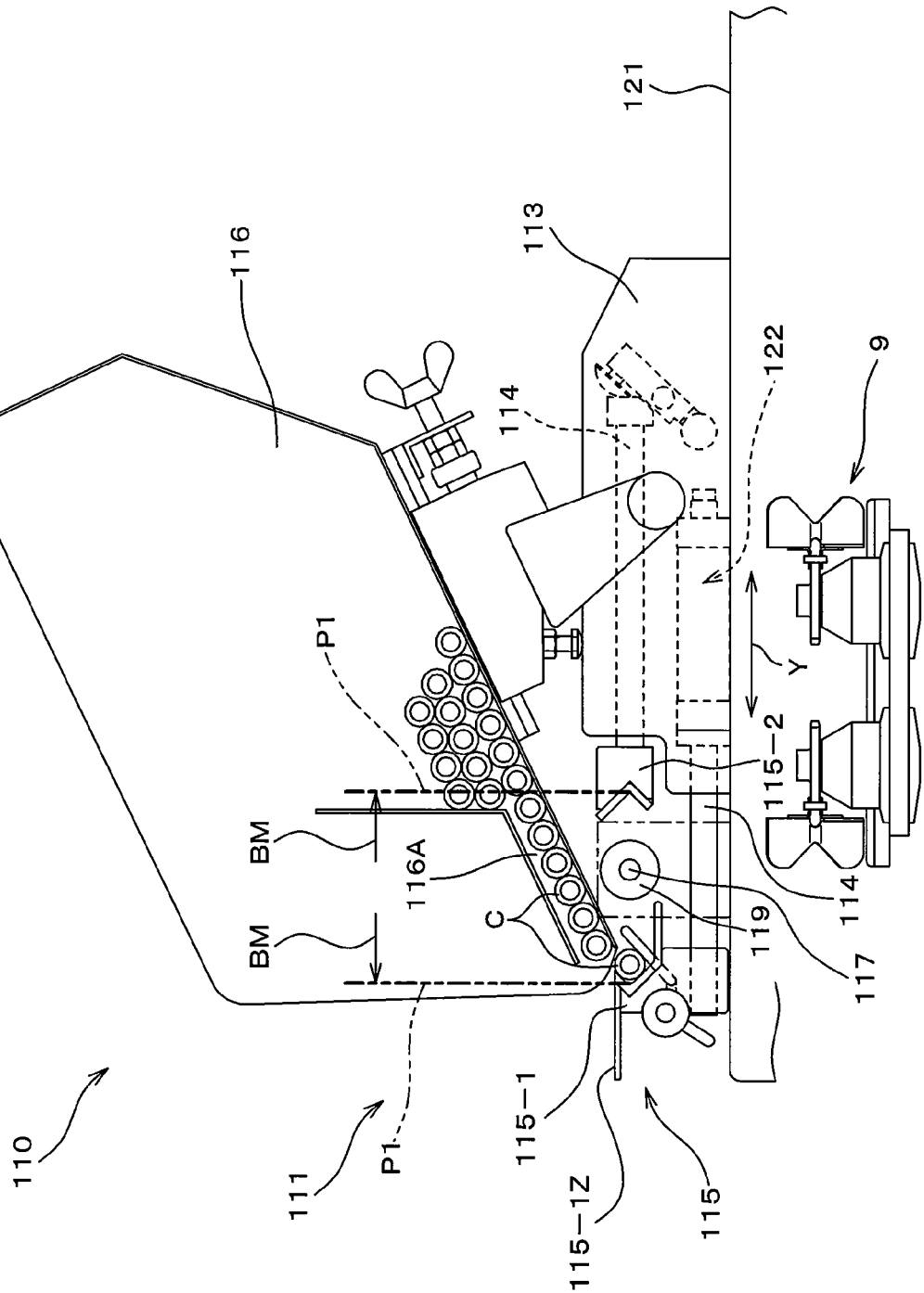
FIG. 14 is an explanatory right side view of a casing loading means shown in FIG. 12.

As shown in FIG. 14, the casing holding means 111 includes a housing 113 provided above the link forming means 9; a pair of reciprocating rods 114 supported reciprocatably by the housing 113; a casing clamper 115 having a pair of a front clamper 115-1 and a rear clamper 115-2 respectively mounted to the pair of reciprocating rods 114; and a casing hopper 116 for stocking the multiplicity of casings C.

Figure 16:
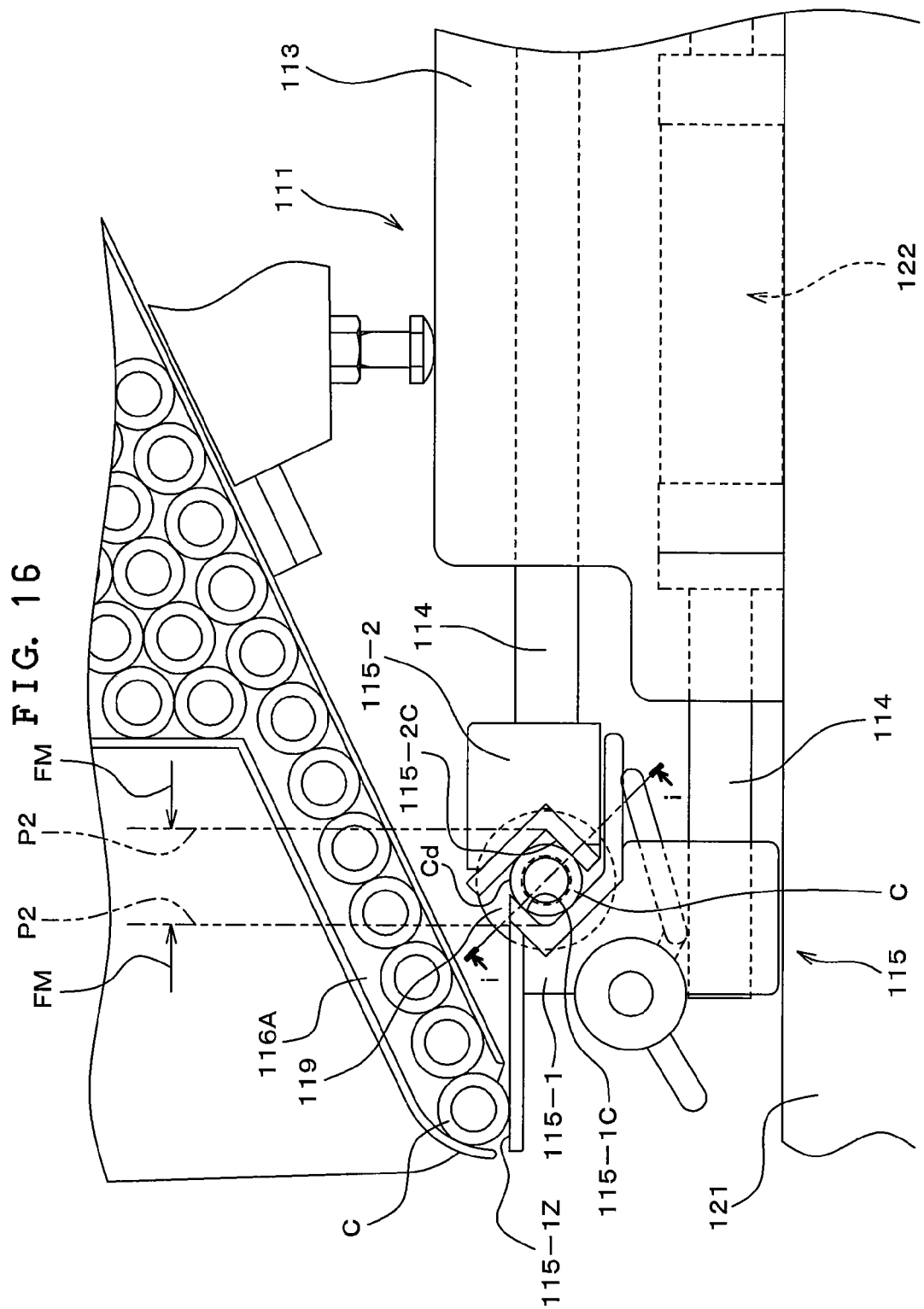
FIG. 16 is an enlarged explanatory right side view of the operation of the casing loading means shown in FIG. 14.

Referring to FIGS. 15 to 17, the casing pushing/advancing means 112 includes a casing pushing/advancing member 117 which moves on the longitudinal axis X1 along the longitudinal direction of the casing clamper 115 in a space SP between the front clamper 115-1 and the rear clamper 115-2 which are in a closed state; and a pushing/advancing member reciprocating means 118, i.e., a known air cylinder 119 serving as the reciprocating linear actuator in this example, for moving the casing pushing/advancing member 117 toward the stuffing tube 2-1. An arrangement may be provided such that a rod 119A of the air cylinder 119 directly abuts against the front end portion Ce of the casing C. Thus the pushing/advancing member reciprocating means 118 can be arranged to serve as the casing pushing/advancing member 117 as well.

Figure 13:
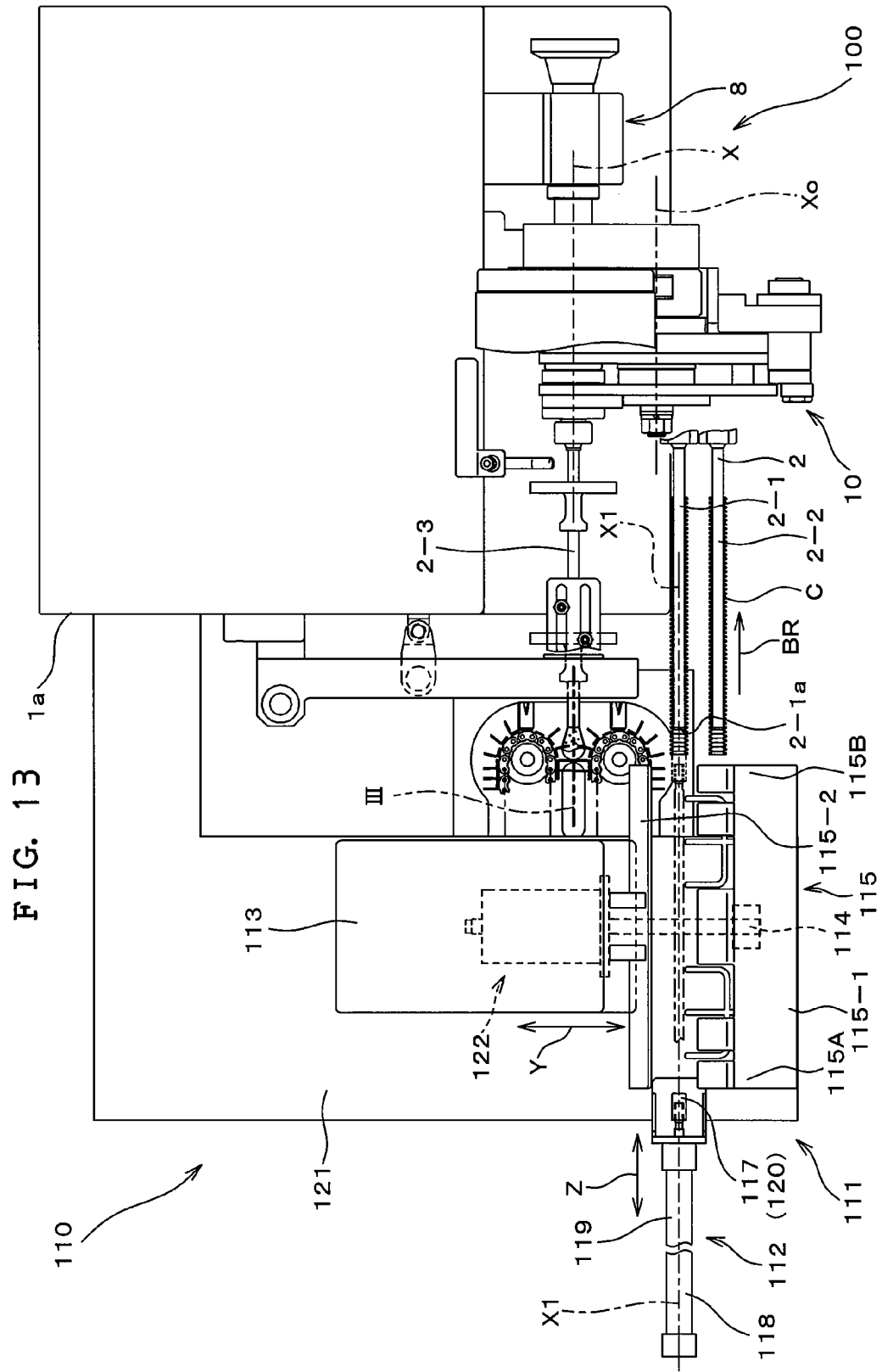
FIG. 13 is an explanatory plan view of FIG. 12.

As particularly shown in FIG. 13, the housing 113 is mounted on a bracket 121 which is fixed to the main body housing 1a and extends in the downstream direction from that main body housing 1a, such that the casing clamper 115 is disposed in a stationary state in the direction of the longitudinal axis X1 at a predetermined position relative to the stuffing tube 2-1.

Figure 12:
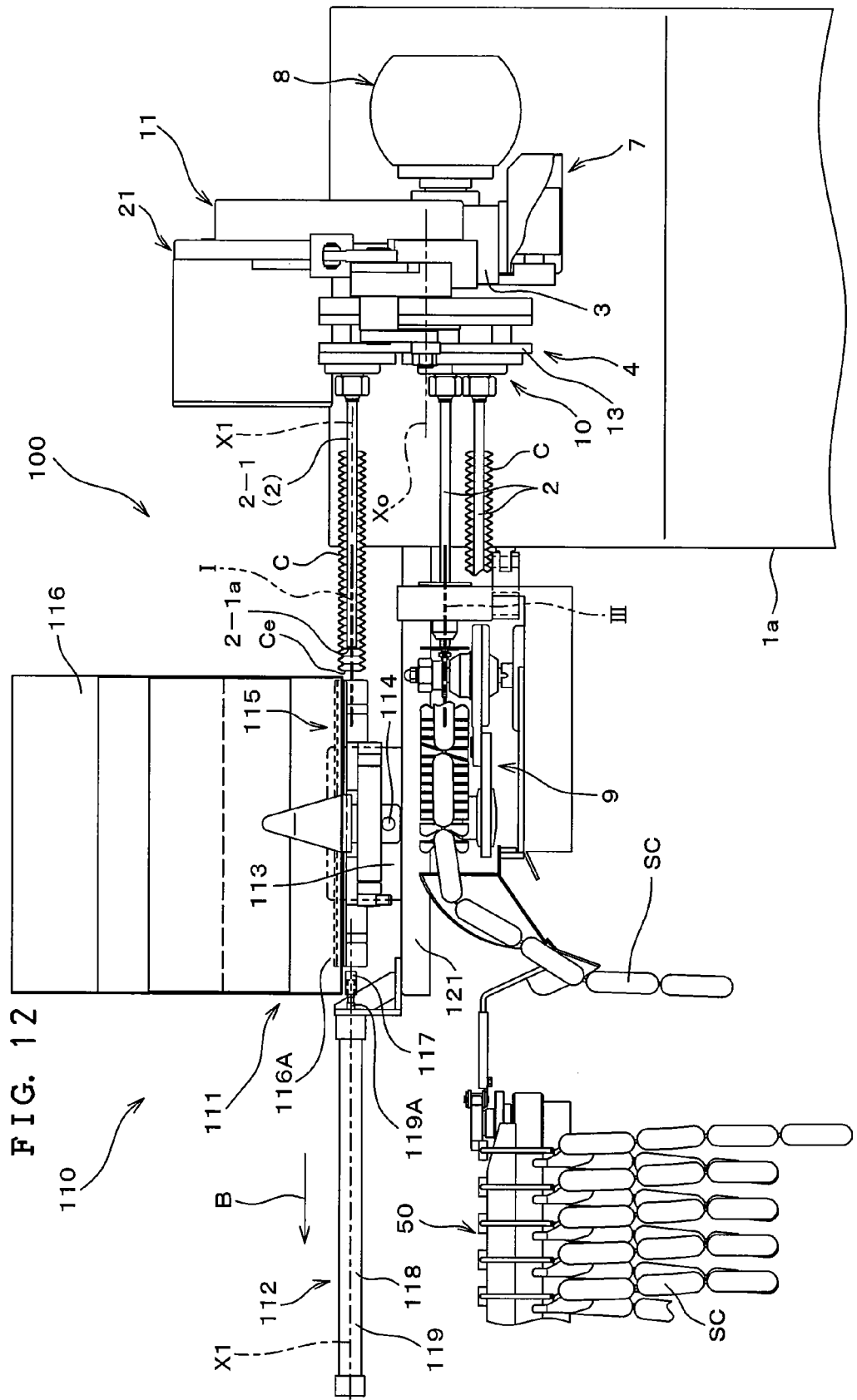
FIG. 12 is an explanatory front elevational view of the manufacturing apparatus in accordance with a further embodiment of the invention.

Referring to FIG. 12, the pair of reciprocating rods 114 are disposed perpendicularly to the longitudinal axis X1. The reciprocating rods 114 are adapted to reciprocate in the directions of arrows Y by a driving mechanism 122 having a known air cylinder unit provided within the housing 113, and impart opening/closing operation in the direction of the arrow Y, i.e., in a direction (direction of the arrow Y) perpendicular to the longitudinal direction of the casing C, to the casing clamper 115 attached to the pair of reciprocating rods 114.

The casing clamper 115 is disposed in such a manner as to extend from the position of a vicinity of the leading end portion 2-1a of the stuffing tube 2-1 horizontally downstream (in the direction of the arrow B) along the longitudinal axis X1, and is adapted to open and close in the direction of the arrow Y perpendicular to the longitudinal axis X1 (see FIG. 12). The casing clamper 115 moves between a position P1 and a position P2. In its open state at the position P1, the casing clamper 115 receives on its front clamper 115-1 one casing C which dropped from the casing hopper 116 (see FIG. 14). In its closed state at the position P2, the casing clamper 115 holds an outer periphery Cd of the casing C by clamping it by the front clamper 115-1 and the rear clamper 115-2, and thereby effects positioning (FIG. 16). The casing clamper 115 is thus arranged to move in the direction (direction of the arrow Y) perpendicular to the longitudinal direction of the casing C from the receiving position P1 for receiving the casing C dropped from the casing hopper 116 provided above the casing clamper 115 (see FIG. 14) to the position X1 where the casing C is aligned with the stuffing tube 2 (see FIG. 14).

The front clamper 115-1 and the rear clamper 115-2 which are at a standstill at the position P2 holds the outer periphery Cd of the casing C while maintaining a state in which one holding portion 115-1C and the other holding portion 115-2C thereof each having a substantially V-shaped cross section are closed up to a holding inside diameter D1 (see FIG. 17(A)). The pair of holding portions 115-1C and 115-2C extend in parallel to the longitudinal axis X1, and the casing C held by this pair of holding portions 115-1C and 115-2C is disposed at a predetermined position downstream of the stuffing tube 2-1 and in a state of being substantially concentric with the longitudinal axis X1, i.e., in a state of being substantially aligned with the stuffing tube 2-1. More specifically, the casing clamper 115 forms the substantially square space SP by the one holding portion 115-1C and the other holding portion 115-2C at the position P2, and accommodates the casing C in that space SP longitudinally movably. As is well shown in FIG. 5, the outer periphery Cd of the casing C which is pushed and advanced by the casing pushing/advancing member 117 moves on the longitudinal axis X1 while being slidably guided by the one holding portion 115-1C and the other holding portion 115-2C, and is sent out from the holding portions 115-1C and 115-2C of the casing clamper 115, and the casing C is thereby delivered onto the stuffing tube 2-1.

The casing holding means 111 is provided with an unillustrated adjusting mechanism for rendering changeable the holding inside diameter D1 which is an opposing interval in order to use casings C of various outside diameters D. Even if the interval D1 is changed, the center of the bore of the casing C held by the casing clamper 115 does not change horizontally and vertically. Since the outer periphery Cd of the casing C is clamped by the opposing two V-grooves 115-1C and 115-2C of the casing clamper 115, the stick-like casing C which is longitudinally curved is corrected straightly. As a result, the centering of the casing C is ensured in the horizontal and vertical directions relative to the stuffing tube 2, so that the casing C can be placed on the stuffing tube 2 without error.

As described above, the holding portions 115-1C and 115-2C are formed in the casing clamper 115, and the one holding portion 115-1C of the front clamper 115-1 is constituted by the one guide surface 115-1C having a substantially V-shaped cross section, while the other holding portion 115-2C of the rear clamper 115-2 is constituted by the other guide surface 115-2C having a substantially V-shaped cross section. Although the shape of each of the holding portions 115-1C and 115-2C of the casing clamper 115 is a V-shape groove, the shape is not limited insofar as the holding portions 115-1C and 115-2C are so shaped as to be able to hold the casing C at the predetermined position and slidably guide the casing C in its longitudinal direction.

As described above, the casing holding means 111 causes respective ones of the pair of holding portions 115-1C and 115-2C of the casing clamper 115 disposed in face-to-face relationship to each other to advance (in directions of arrows FM) toward each other of the mutually opposing holding portions 115-1C and 115-2C to close the casing clamper 115 (see FIG. 6), then stops the advancing, and holds the outer periphery Cd of the casing C by clamping it by the pair of holding portions 115-1C and 115-2C which closed up to the predetermined opposing interval, i.e., the holding inside diameter D1 in this case, thereby effecting positioning so that the casing C is substantially aligned with the stuffing tube 2-1. Although, in this example, the length of the holding portions 115-1C and 115-2C is set to not less than the overall length of the casing C, as shown in FIG. 5, the length of the holding portions 115-1C and 115-2C is not limited and may be shorter than the overall length of the casing C insofar as it is of such a length as to be able to obtain the operational effects of the correction of the curved shape and the prevention of local bending or loosening between the fold Cs and the fold Cs in the use of the high-rigidity cellulose casing C which is curved in its longitudinal direction or the low-rigidity collagen casing C which is likely to bend locally.

As shown in FIG. 14, the casing hopper 116 is supported by the housing 113 and is disposed above the casing clamper 115. The casing hopper 116 has a portion 116A where the casings C are accumulated above the front clamper 115-1, such that one casing C is dropped and fed onto the casing clamper 115 by one reciprocating operation of the casing clamper 115.

Figure 7:
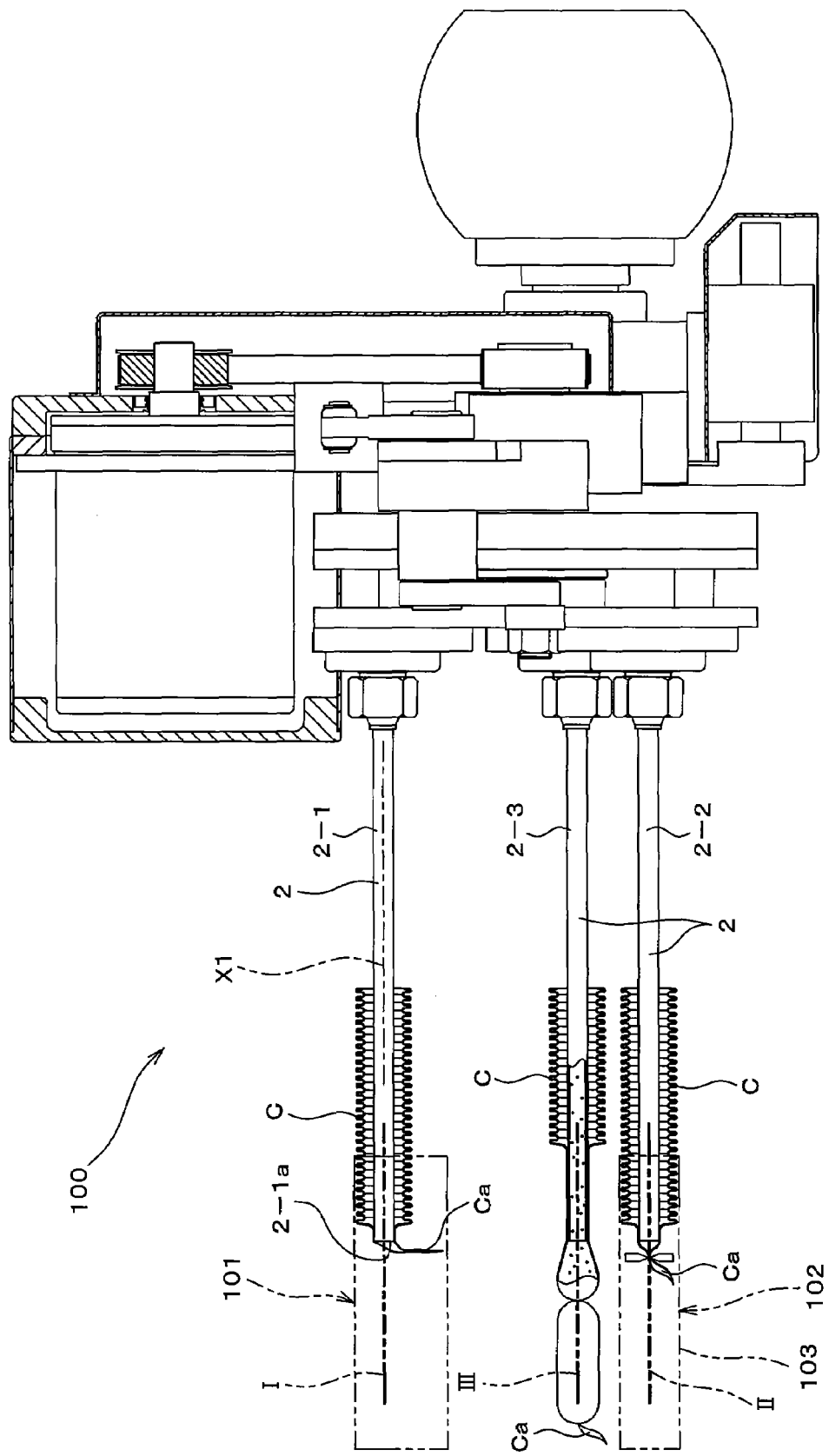
FIG. 7 is an explanatory front view of major structural portions of the manufacturing apparatus in accordance with another embodiment of the invention.
Figure 8:
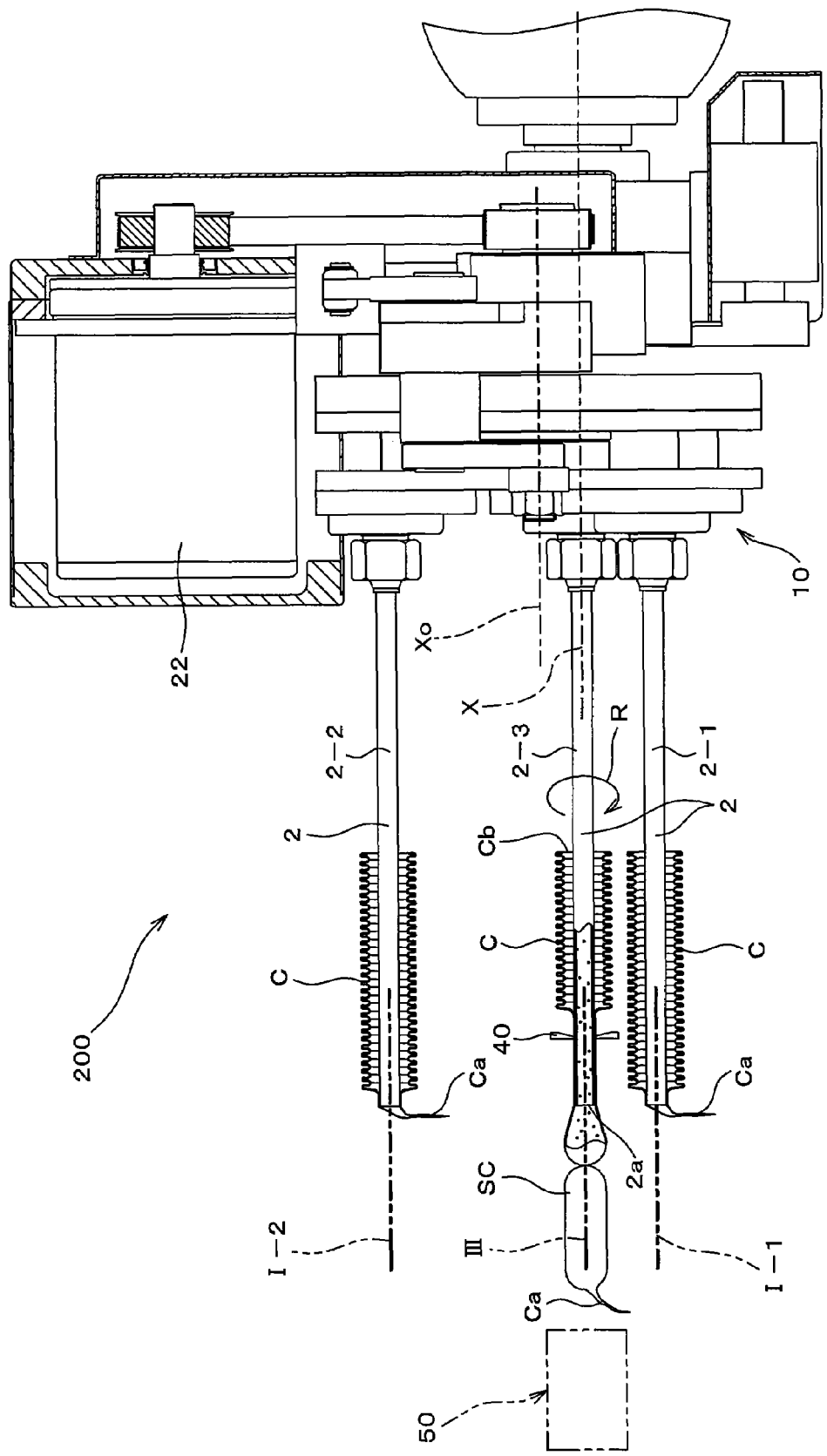
FIG. 8 is an explanatory front view of major structural portions of the manufacturing apparatus in accordance with still another embodiment of the invention.
Figure 9:
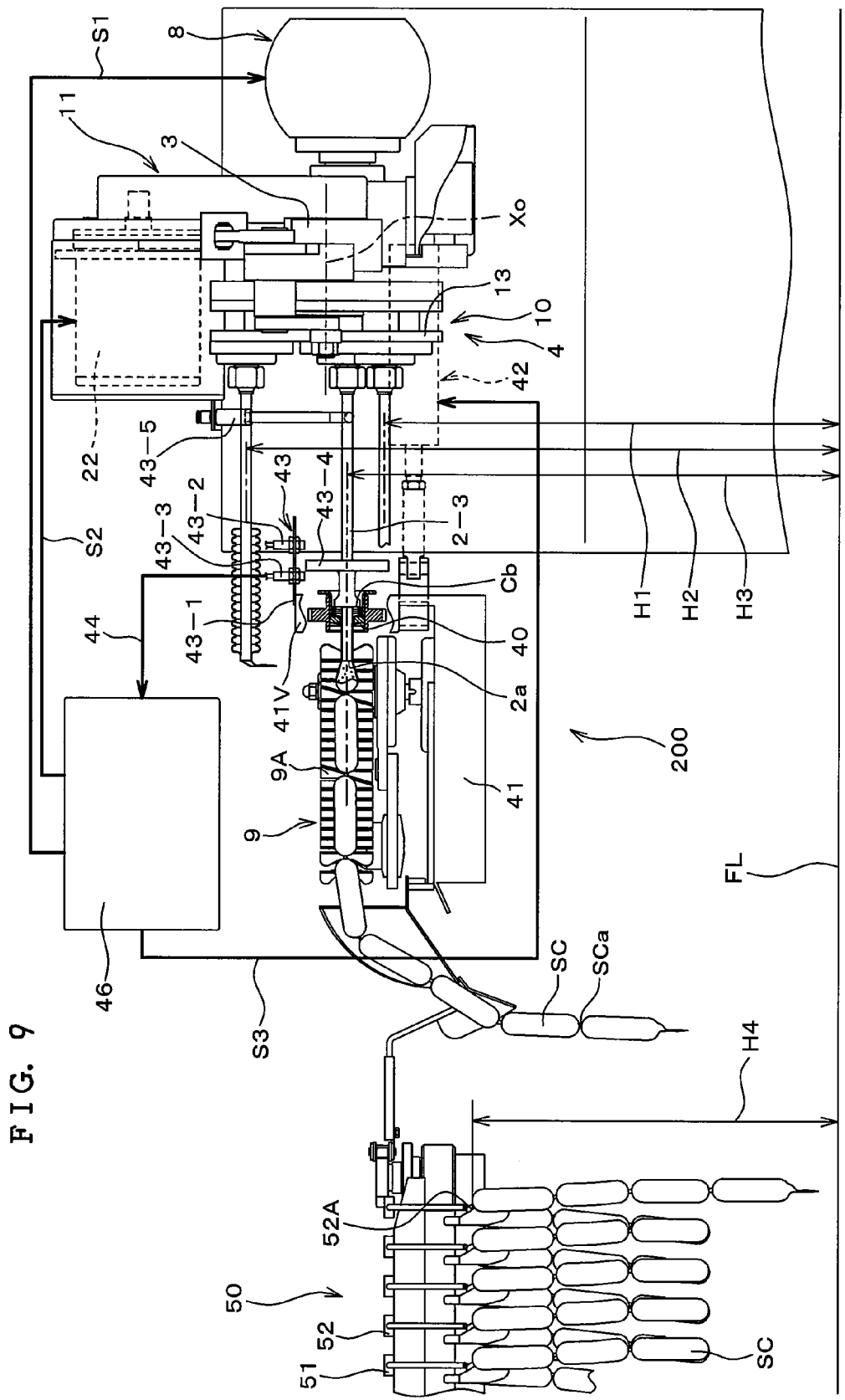
FIG. 9 is an explanatory side view illustrating the entirety of the manufacturing apparatus shown in FIG. 8.

Referring to FIGS. 5 and 7, the casing pushing/advancing member 117 is mounted to the rod 119A of the air cylinder 119 and is at a standstill at a standby position P3 located in the vicinity of a downstream end portion 115A of the casing clamper 115. The casing pushing/advancing member 117 is constituted by a cylindrical member 120 having an outside diameter D which is smaller than the aforementioned holding inside diameter D1 and is larger than a shirred inside diameter D2 (see FIG. 15(B)), and a pushing/advancing surface 120A for abutting against the front end portion Ce of the casing C is formed on the cylindrical member 120. A magnitude J of the difference between the holding inside diameter D1 and the outside diameter D of the cylindrical member 120 is not limited. For example, it may be a small amount of gap J which makes it possible for the pair of holding portions 115-1C and 115-2C to slidably guide the casing pushing/advancing member 117 which is pushing and advancing the casing C. The cylindrical member 120, while moving in the aforementioned substantially square space SP of the casing clamper 115 which is in the closed state, abuts against the front end portion Ce of the casing C accommodated in that space SP, and pushes and advances that casing C toward the stuffing tube 2-1. The casing pushing/advancing member 117 is not limited to the cylindrical member 120, and may be constituted by, for example, a member having a pushing/advancing surface 117A of a square shape which complementarily fits in the aforementioned substantially square space SP (see FIG. 17(B)). The pushing/advancing surface 117A of the square shape has a wider pushing/advancing area.

The pushing/advancing member reciprocating means 118, i.e., the known air cylinder 119 serving as the reciprocating linear actuator in this example, is fixedly provided on the bracket 121, and is disposed on the longitudinal axis X1 extending downstream of the casing clamper 115 (in the direction of the arrow B). The rod 119A of the air cylinder 119 reciprocates in the directions of arrows Z, whereby the cylindrical member 120 is arranged to reciprocate between the aforementioned standby position P3 and a pushing/advancing stop position P4 located between an upstream end portion 115B of the casing clamper 115 and the leading end portion 2-1a of the stuffing tube 2-1.

As described above, the casing loading means 110 is adapted to push and advance, in the space SP between the pair of holding portions 115-1C and 115-2C extending along the longitudinal axis X1, the front end portion Ce of the casing C being held by the casing clamper 115 toward the leading end portion 2-1a of the stuffing tube 2-1 by, in this case, the casing pushing/advancing member 117 which moves in the space SP. The casing C is adapted to move toward the leading end portion 2-1a of the stuffing tube 2-1 while the outer periphery Cd of the casing C being pushed and advanced by the casing pushing/advancing member 117 is slid on the pair of holding portions 115-1C, 115-2C.

Referring to FIGS. 14 to 16, a description will be given of the operation of the casing loading means 110. Upon completion of the loading of the casing C onto the stuffing tube 2-1, the cylindrical member 120 (casing pushing/advancing member 117) returns from the pushing/advancing stop position P4 to the standby position P3, whereupon the casing clamper 115 causes each of the pair of holding portions 115-1C and 115-2C to recede (in the direction of arrow BM) from the opposing one of the holding portions 115-1C and 115-2C to return from the position P2 to the position P1 (see FIG. 14) and stop there in the open state. After the casing C which dropped from the casing hopper 116 is placed on the front clamper 115-1, the casing clamper 115 moves to the position P2 to dispose the casing C on the longitudinal axis X1. The casings C in the casing hopper 116 are prevented from dropping by a casing shutter portion 115-1Z of the front clamper 115-1 at the position P2. When the stuffing into the casing C by the stuffing tube 2-3 is completed, and an empty stuffing tube 2 is moved from the filling position III to the loading position I by the indexing rotation of the stuffing tube moving body 10 in the direction of the arrow A (see FIG. 2), the cylindrical member 120 at the standby position P3 starts to move in the direction of the arrow BR. When the pushing/advancing surface 120A of the cylindrical member 120 reaches the pushing/advancing stop position P4, the loading of the casing C onto the stuffing tube 2-1 is completed.

Figure 18:
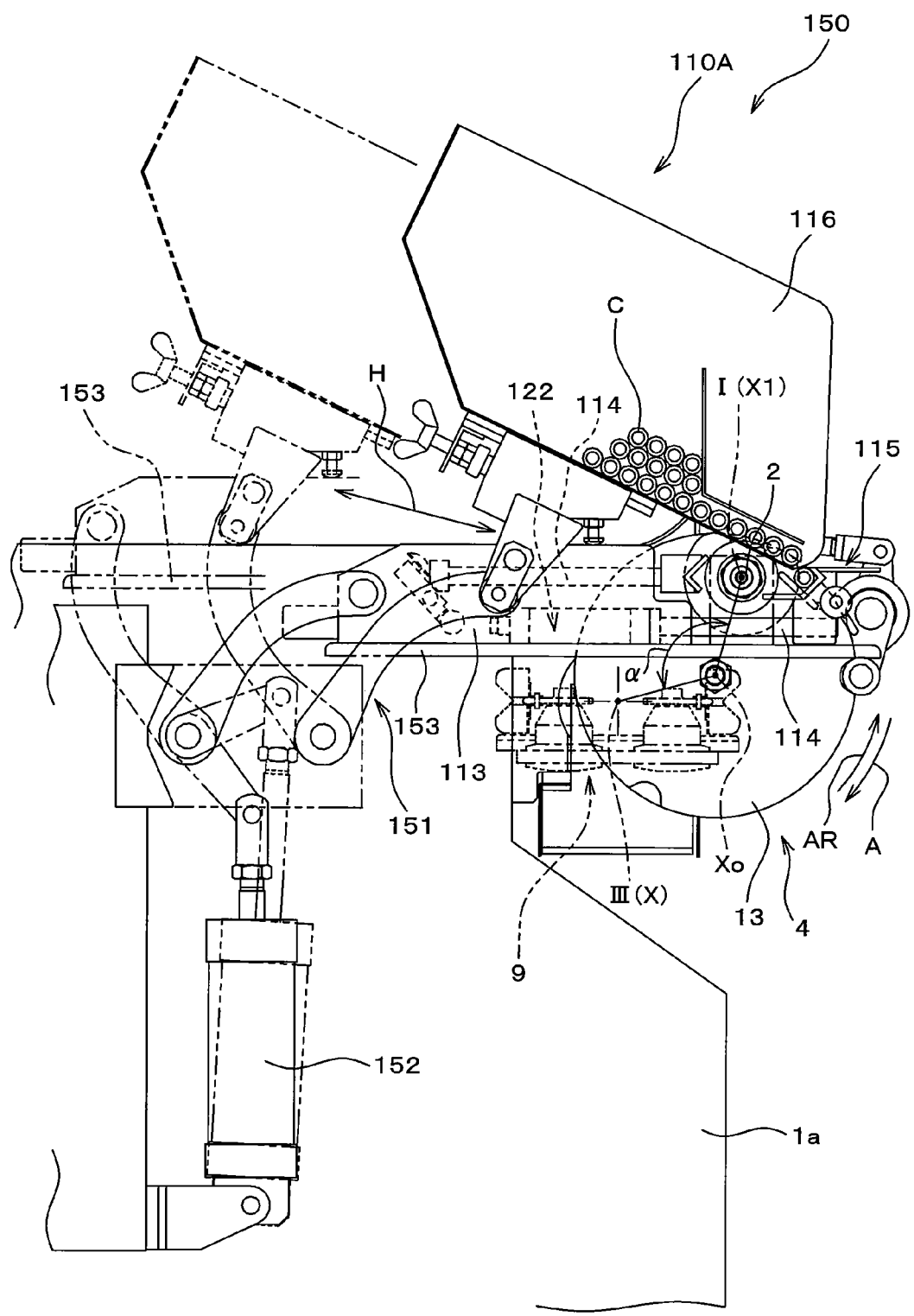
FIG. 18 is an explanatory front elevational view of another manufacturing apparatus in accordance with a further embodiment of the invention.

Next, referring mainly to FIG. 18, a description will be given of a casing loading means 110A in accordance with another embodiment of the invention, which is provided in an apparatus 150 for manufacturing chains of linked food products such as sausages. The manufacturing apparatus 150 is different from the above-described manufacturing apparatuses 100 and 200 in that only one stuffing tube 2 is provided.

In the manufacturing apparatus 150, the loading position I for loading the casing C onto the stuffing tube 2 provided on the stuffing tube support 13 and the filling position III for filling the casing C with the material are provided at a predetermined angle α, i.e., at an interval of 120 degrees in this embodiment, about the rotational axis Xo of the stuffing tube support 13. The stuffing tube moving means 4 is adapted to rotatively move in the direction of arrow AR by a predetermined amount, i.e., by 120 degrees in this embodiment, and stop with the stuffing tube 2 rearranged at the filling position III from the loading position I. Further, upon completion of the filling, the stuffing tube moving means 4 is adapted to move the stuffing tube 2 by 120 degrees in the direction of the arrow A from the filling position III to the loading position I so as to be ready for the loading of an ensuing casing C. Here, the predetermined angle α may be set to, for example, 180 degrees.

The casing loading means 110A is disposed downstream (in the direction of the arrow B) of the stuffing tube 2 which remains at a standstill at the loading position I located upwardly of the rotational axis Xo (see FIG. 12). The casing loading means 110A is so adapted as to be able to be moved away from the link forming means 9 for the purpose of the adjustment of the link forming means 9 and other purposes. A link mechanism 151 is provided on the main body housing 1a. The link mechanism 151 is adapted to reciprocate in the vertical direction and the horizontal direction (direction of arrow H) by being driven by an air cylinder 152. The link mechanism 151 is connected to a base plate 153 to which the housing 113 accommodating the driving mechanism 122 is secured. The base plate 153 is adapted to reciprocate in the direction of the arrow H with respect to the link forming means 9 in accordance with the operation of the link mechanism 151.

According to the casing loading apparatuses 110 and 110A in accordance with these embodiments, since the casing C held by being clamped between the opposing two holding portions 115-1C and 115-2C is pushed and advanced, a compressive force in the direction in which the fold Cs and the fold Cs are brought close to each other acts in the casing C, thereby making it possible to prevent the loosening between the fold Cs and the fold Cs.

According to the casing loading means 110 and 110A in accordance with these embodiments, since the casing C is loaded onto the stuffing tube 2 by pushing and advancing the front end portion Ce of the casing C by a predetermined distance L, the casing loading means becomes inexpensive with a simplified structure.

The casing pushing/advancing member 117 may be driven by the pushing/advancing member reciprocating means 118 which is offset from the longitudinal axis X1 in juxtaposition to the casing pushing/advancing member 117 on the longitudinal axis X1. The pushing/advancing member reciprocating means 118 is not limited to an actuator of a reciprocating linear type (a known air cylinder or the like). For example, the casing C may be pushed and advanced by the casing pushing/advancing member 117 mounted to a ball screw which is driven by a control motor or to a wrapping connector traveling body which is driven by a control motor.

If the stuffing tube 2 is provided in the stuffing tube moving body 10, the coupling means 7 in the manufacturing apparatus 150 having one stuffing tube 2 exhibits operational effects identical to those of the coupling means 110 in the manufacturing apparatus 1 and the manufacturing apparatus 100 having the plurality of stuffing tubes 2. Therefore, the coupling means in accordance with the invention is applicable to an apparatus for manufacturing sausages or the like having one or more stuffing tubes.

If the stuffing tube 2 is provided on the stuffing tube moving body 10, the casing loading means 110A in the manufacturing apparatus 150 having one stuffing tube 2 exhibits operational effects identical to those of the casing loading means 110 in the manufacturing apparatus 100 having the plurality of stuffing tubes 2. Therefore, the method and apparatus for loading a casing onto a stuffing tube in accordance with the invention are applicable to an apparatus for manufacturing sausages or the like having one or more stuffing tubes. The stuffing tube moving body 10 is not limited to the rotationally moving type, and is also applicable to, for instance, a linearly reciprocating type.

The above-described apparatus for manufacturing chains of linked food products such as sausages with twisted portions and having a plurality of stuffing tubes in accordance with the invention is extensively applicable to apparatuses which use artificial casings in addition to natural intestine casings.

What is claimed is:

1. An apparatus for manufacturing chains of linked food products such as sausages with twisted portions and having a plurality of stuffing tubes, comprising:
    a hollow member on a longitudinal axis for receiving the supply of a material of a food product from material supplying means;
    a stuffing tube moving body provided rotatably about a rotational axis located at a predetermined distance from the longitudinal axis;
    a plurality of hollow spindle members provided through said stuffing tube moving body in such a manner as to be disposed at equal intervals about the rotational axis;
    a plurality of stuffing tubes fixed to said plurality of hollow spindle members, respectively;
    a braking member which comes into contact with a casing loaded on said stuffing tube in a state in which said braking member is fitted on said stuffing tube;
    material-supply-stop commanding means for transmitting a material supply stop signal for stopping the supplying of the food product material to said hollow member;
    braking-member disengaging driving means for disengaging said braking member from said stuffing tube;
    stuffing-tube-moving-body driving means for moving said plurality of hollow spindle members to a position of communication with said hollow member by rotating said stuffing tube moving body through a predetermined angle about the rotational axis;
    suspending members which are disposed downstream of said stuffing tube fixed to said hollow spindle member communicating with said hollow member, and move in a state in which the stuffed casing filled with the food product material is suspended therefrom; and
    controlling means for controlling the operation of said braking-member disengaging driving means and said stuffing-tube-moving-body driving means after the signal transmission by said material-supply-stop commanding means.

2. The apparatus for manufacturing chains of linked food products such as sausages with twisted portions and having a plurality of stuffing tubes according to claim 1, wherein said stuffing tube moving body is provided with at least three hollow spindle members, and one of said hollow spindle members which is at a standstill at a position higher than said hollow member is moved downward to the position of communication with said hollow member by the rotation of said stuffing tube moving body through the predetermined angle.

3. A method of manufacturing chains of linked food products such as sausages with twisted portions by using the apparatus for manufacturing chains of linked food products such as sausages with twisted portions and having a plurality of stuffing tubes according to claim 1, comprising the steps of:
    performing through an operator's manual operation processing required for a stuffed casing suspended from said suspending members while a stuffed casing is being formed by said stuffing tube;
    performing through a same operator's manual operation the loading of the casing onto another one of said stuffing tubes while the stuffed casing is being formed by said stuffing tube; and
    performing through the same operator's manual operation required processing for the stuffed casing suspended from said suspending members during the rotation of said stuffing tube moving body which is effected after the completion of the formation of the stuffed casing by said stuffing tube.

4. An apparatus for manufacturing chains of linked food products such as sausages with twisted portions and having a plurality of stuffing tubes, comprising:
    a hollow member on a longitudinal axis for receiving the supply of a material of a food product from material supplying means;
    a stuffing tube moving body provided rotatably about a rotational axis located at a predetermined distance from the longitudinal axis;
    at least one hollow spindle member provided through said stuffing tube moving body in such a manner as to be disposed at a position of a predetermined radial distance from the rotational axis;
    a stuffing tube fixed to said hollow spindle member;
    hollow-member rotatively driving means for rotating said hollow member about the longitudinal axis; and
    coupling means provided on the longitudinal axis and operative to couple said hollow member and said hollow spindle member which has completed the rotational movement through the predetermined angle.

5. The apparatus for manufacturing chains of linked food products such as sausages with twisted portions and having a plurality of stuffing tubes according to claim 4, wherein said coupling means has a driven and engaged portion provided on said hollow spindle member, and a tubular member having a driving and engaging portion for engaging the driven and engaged portion fitted to said hollow member reciprocatingly movably in a direction of the longitudinal axis.

6. The apparatus for manufacturing chains of linked food products such as sausages with twisted portions and having a plurality of stuffing tubes according to claim 4, wherein said stuffing tube moving body has a stuffing tube moving body holder for maintaining at a fixed position in the direction of the longitudinal axis an end face of said hollow spindle member during its movement and stoppage.

7. An apparatus for manufacturing chains of linked food products such as sausages with twisted portions and having a plurality of stuffing tubes, comprising:
    a stuffing tube at a loading position for loading a casing onto said stuffing tube;
    a stuffing tube at a leading end closing position for closing a leading end of the casing located on said stuffing tube;
    a stuffing tube at a filling position for filling a material into the casing with its leading end closed; and
    a stuffing tube moving body which rotates so that said stuffing tube with the casing loaded thereon moves to the leading end closing position, said stuffing tube with the leading-end-closed casing loaded thereon moves to the filling position, and said stuffing tube at the filling position moves to the loading position, respectively, said stuffing tube at the loading position, said stuffing tube at the leading end closing position, and said stuffing tube at the filling position being provided at least one each.

8. The apparatus for manufacturing chains of linked food products such as sausages with twisted portions and having a plurality of stuffing tubes according to claim 7, further comprising:
casing leading end closing means for closing the leading end of the casing loaded on said stuffing tube at the leading end closing position.

9. An apparatus for manufacturing chains of linked food products such as sausages with twisted portions and having a plurality of stuffing tubes, comprising:
a hollow member on a longitudinal axis for receiving the supply of a material of a food product from material supplying means;
a stuffing tube moving body provided rotatably about a rotational axis located at a predetermined distance from the longitudinal axis;
at least one hollow spindle member provided through said stuffing tube moving body in such a manner as to be disposed at a position of a predetermined radial distance from the rotational axis;
a stuffing tube fixed to said hollow spindle member;
casing holding means holding an outer periphery of a casing downstream of said stuffing tube so that the casing to be loaded onto the stuffing tube is substantially aligned with the stuffing tube which has rotatively moved about the rotational axis through a predetermined angle from said hollow member on the longitudinal axis; and
a casing pushing/advancing member for pushing and advancing toward said stuffing tube the casing whose outer periphery is held by said casing holding means,
wherein said casing holding means has a pair of holding portions which are disposed in face-to-face relationship to each other and hold the outer periphery of the casing by clamping the same with a predetermined interval therebetween which is formed by the stopping of the advancing toward each other of said mutually opposing holding portions, and
wherein said casing pushing/advancing member has a casing pushing/advancing surface which abuts against a front end portion of the casing with its outer periphery held by said pair of holding portions and moves in a space between said pair of holding portions toward said stuffing tube such that the outer periphery of the casing moves in the space between said pair of holding portions extending in a longitudinal direction of the casing toward said stuffing tube while sliding on said pair of holding portions.

10. A method for loading a casing for a food product such as sausage onto a stuffing tube, comprising the steps of:
disposing casing holding means holding an outer periphery of a casing downstream of a stuffing tube so that the casing is substantially aligned with the stuffing tube, and loading onto the stuffing tube the casing held by the casing holding means, comprising the steps of:
advancing each of a pair of holding portions of said casing holding means disposed in face-to-face relationship to each other toward an opposing one of said pair of holding portions;
stopping the advancing, and holding the outer periphery of the casing by clamping the same by said pair of holding portions opposing each other with a predetermined interval therebetween, to thereby effect positioning so that the casing is substantially aligned with said stuffing tube;
pushing and advancing toward said stuffing tube a front end portion of the held casing by a casing pushing/advancing member which moves in a space between said pair of holding portions extending in a longitudinal direction of the casing; and
moving toward said stuffing tube the casing being pushed and advanced by said casing pushing/advancing member, while the outer periphery of the casing is slid on said pair of holding portions.

11. An apparatus for loading a casing for a food product such as sausage onto a stuffing tube, in which casing holding means holding an outer periphery of a casing is disposed downstream of a stuffing tube so that the casing is substantially aligned with the stuffing tube, and the casing held by the casing holding means is loaded onto the stuffing tube, comprising:
a pair of holding portions which are provided in said casing holding means, are disposed in face-to-face relationship to each other, and hold an outer periphery of a casing by clamping the same with a predetermined interval therebetween which is formed by the stopping of the advancing toward each other of said mutually opposing holding portions; and
a casing pushing/advancing member which abuts in a space between said pair of holding portions extending in a longitudinal direction of the casing against a front end portion of the casing with its outer periphery held by said pair of holding portions, and moves in the space between said pair of holding portions toward said stuffing tube such that the outer periphery of the casing moves toward said stuffing tube while sliding on said pair of holding portions.

12. The apparatus for loading a casing for a food product such as sausage onto a stuffing tube according to claim 11, wherein said holding portions are formed in a casing clamper which is stationary with respect to the longitudinal direction of the casing, and said casing clamper extends in the longitudinal direction of the casing.

13. The apparatus for loading a casing for a food product such as sausage onto a stuffing tube according to claim 12, wherein said casing clamper has a pair of a front clamper and a rear clamper, and one holding portion of said front clamper is constituted by one guide surface having a substantially V-shaped cross section, while another holding portion of said rear clamper is constituted by another guide surface having a substantially V-shaped cross section.

14. The apparatus for loading a casing for a food product such as sausage onto a stuffing tube according to claim 12, wherein said casing clamper moves in a direction perpendicular to the longitudinal direction of the casing from a receiving position for receiving the casing which drops from a casing hopper provided above said casing clamper to a position where the casing is substantially aligned with said stuffing tube.

15. The apparatus for loading a casing for a food product such as sausage onto a stuffing tube according to claim 14, wherein a driving mechanism for reciprocating said casing clamper between the receiving position and the position of substantial alignment is provided at a position above link forming means.

16. The apparatus for loading a casing for a food product such as sausage onto a stuffing tube according to claim 15, wherein a housing in which said driving mechanism is provided is secured to a base plate, and said base plate reciprocates with respect to said link forming means.

* * * * *